(12) United States Patent
Gupta et al.

(10) Patent No.: US 9,940,843 B2
(45) Date of Patent: Apr. 10, 2018

(54) SYSTEMS AND METHODS FOR MANAGING RESTRICTED AREAS FOR UNMANNED AUTONOMOUS VEHICLES

(71) Applicant: QUALCOMM Incorporated, San Diego, CA (US)

(72) Inventors: Rajarshi Gupta, Sunnyvale, CA (US); Michael Franco Taveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/286,049

(22) Filed: Oct. 5, 2016

(65) Prior Publication Data

US 2018/0068570 A1 Mar. 8, 2018

Related U.S. Application Data

(62) Division of application No. 14/989,019, filed on Jan. 6, 2016, now Pat. No. 9,626,874.

(51) Int. Cl.
| | |
|---|---|
| *G08G 1/123* | (2006.01) |
| *G08G 5/00* | (2006.01) |
| *G07C 5/00* | (2006.01) |
| *H04B 7/185* | (2006.01) |
| *B64C 39/02* | (2006.01) |

(52) U.S. Cl.
CPC ......... *G08G 5/0069* (2013.01); *B64C 39/024* (2013.01); *G07C 5/008* (2013.01); *G08G 5/006* (2013.01); *G08G 5/0013* (2013.01); *G08G 5/0026* (2013.01); *G08G 5/0082* (2013.01); *H04B 7/18506* (2013.01); *B64C 2201/141* (2013.01)

(58) Field of Classification Search
USPC .......................................................... 701/517
See application file for complete search history.

(56) References Cited

U.S. PATENT DOCUMENTS

| | | | |
|---|---|---|---|
| 7,228,232 B2 | 6/2007 | Bodin et al. | |
| 8,849,308 B2 | 9/2014 | Marti et al. | |
| 9,052,197 B2 | 6/2015 | Van Os et al. | |
| 9,626,874 B1 * | 4/2017 | Gupta ................. | G08G 5/0069 |
| 9,828,874 B2 | 4/2017 | Gupta et al. | |
| 2009/0157233 A1 | 6/2009 | Kokkeby et al. | |
| 2009/0210109 A1 | 8/2009 | Ravenscroft | |
| 2010/0042269 A1 | 2/2010 | Kokkeby et al. | |
| 2010/0286859 A1 | 11/2010 | Feigh et al. | |
| 2012/0158280 A1 | 6/2012 | Ravenscroft | |

(Continued)

OTHER PUBLICATIONS

Heng L., et al, "Autonomous Visual Mapping and Exploration with a Micro Aerial Vehicle," 2014, 29 pages.

*Primary Examiner* — Tyler Paige
(74) *Attorney, Agent, or Firm* — The Marbury Law Group

(57) ABSTRACT

Methods, systems, and devices for providing data from a server to a UAV, enabling the UAV to navigate with respect to areas of restricted air space ("restricted areas"). A server may receive from a UAV, a request for restricted area information based on a position of the UAV. The server may determine boundaries of a surrounding area containing the position of the UAV and a number of restricted areas. The server may transmit coordinate information to the UAV defining the restricted areas contained within the surrounding area.

29 Claims, 11 Drawing Sheets

(56) References Cited

U.S. PATENT DOCUMENTS

| | | | |
|---|---|---|---|
| 2015/0254988 A1* | 9/2015 | Wang | G05D 1/0214 |
| | | | 701/3 |
| 2016/0180719 A1* | 6/2016 | Wouhaybi | G08G 5/0082 |
| | | | 701/4 |
| 2016/0225264 A1 | 8/2016 | Taveira | |
| 2016/0240087 A1* | 8/2016 | Kube | G08G 5/006 |
| 2017/0039861 A1* | 2/2017 | Ceribelli | G08G 5/0069 |

* cited by examiner

SYSTEMS AND METHODS FOR MANAGING RESTRICTED AREAS FOR UNMANNED AUTONOMOUS VEHICLES

RELATED APPLICATIONS

This application is a divisional of U.S. Non-provisional patent application Ser. No. 14/989,019 entitled "Systems and Methods for Managing Restricted Areas for Unmanned Autonomous Vehicles" filed Jan. 6, 2016, the entire contents of which are hereby incorporated by reference for all purposes.

BACKGROUND

As unmanned autonomous vehicles (UAVs) become ubiquitous, the challenge of preventing UAVs from flying into restricted air spaces will become more complex and increasingly important. Examples of restricted airspace include but are not limited to airports, airplane flight paths, no-fly zones, buildings/skyscrapers, military reservations, stadiums, private property, and other geographic boundaries. Government aviation authorities are developing guidelines and regulations for UAV operations of all kinds (civil, commercial, recreational, etc.), including rules for controlling UAVs in and around restricted airspaces.

UAVs may be required to adhere autonomously to no-fly zone policies, which may proliferate as governments and individuals place restrictions on over flights by UAVs. No-fly zones may be include residences (e.g., where each residence may define overflight policies), irregularly shaped zones (e.g., parks, schools, airport facilities, etc.), time dependent zones (e.g., flight over schools permitted except during school hours), no-fly zones that are dynamic/condition dependent (e.g., flight over a park permitted, but not if the President is visiting the neighborhood). In rural areas, the density of restricted areas may be low, but in urban areas, the density of restricted areas may be high.

SUMMARY

Various embodiments include methods for providing data from a server to an unmanned autonomous vehicle (UAV) enabling the UAV to navigate with respect to areas of restricted air space ("restricted areas").

Various embodiments may include transmitting, by the UAV to the server, a request for restricted area information, receiving, from the server coordinate information defining coordinate information defining restricted areas contained within a surrounding area, and navigating through the surrounding area based at least on the first coordinate information. Some embodiments may further include the UAV determining the second coordinate information defining the surrounding area based on information available to the UAV, and transmitting the boundary coordinates defining the surrounding area to the server along with the request for restricted area information. Some embodiments may further include transmitting from the UAV to the server position information of the UAV, and receiving, from the server by the UAV, second coordinate information defining boundaries of the surrounding area. In some embodiments, navigating through the surrounding area based at least on the first coordinate information may involve navigating based on the first coordinate information to avoid the restricted areas in the surrounding area.

Some embodiments may further include determining, by the UAV, whether the UAV is approaching a boundary of the surrounding area, and transmitting, by the UAV to the server, a request for updated restricted area information along with an updated position of the UAV. In some embodiments, determining whether the UAV is approaching a boundary of the surrounding area may include determining that the UAV is approaching a boundary of the surrounding area when the position of the UAV plus an uncertainty of the position of the UAV approaches a boundary of the surrounding area.

Some embodiments may further include receiving, from the server by the UAV, an expiration time for the received coordinate information defining restricted areas contained within the surrounding area, determining, by the UAV, whether the expiration time has expired, and transmitting a request for updated restricted area information in response to determining that the expiration time has passed.

Some embodiments may further include transmitting along with the request for restricted area information one or more parameters including information related to a bandwidth of a communication link between the UAV and the server, an identity of the UAV, a type of the UAV, a speed of the UAV, a destination of the UAV, a direction of the UAV, UAV flying environmental information, and a presence of an obstacle near the UAV.

Various embodiments may include receiving, by the server from the UAV, a request for restricted area information, determining, by the server, boundaries of a surrounding area containing the position of the UAV, and transmitting, from the server to the UAV, coordinate information defining the restricted areas contained within the surrounding area.

In some embodiments, determining boundaries of a surrounding area containing the position of the UAV may be based at least in part on a density of restricted areas. In some embodiments, determining boundaries of a surrounding area containing the position of the UAV may be based on one or more additional parameters selected from the group consisting of information related to a network interface bandwidth of a communication link between the UAV and the server, an identity of the UAV, a type of the UAV, a speed of the UAV, a destination of the UAV, a direction of the UAV, UAV flying environmental information, a time of day, a day of the week, a day of the month, a day of the year, a season, a change frequency of restricted areas, a presence of an obstacle, and a weather condition in the surrounding area.

In some embodiments, determining boundaries of a surrounding area containing the position of the UAV bas may include determining the boundaries of the surrounding area based on bandwidth available for transmitting data to the UAV. In some embodiments, determining boundaries of a surrounding area containing the position of the UAV may include determining the boundaries of the surrounding area such that the position of the UAV is contained within the surrounding area but is not centered in the surrounding area.

Some embodiments may further include identifying in a transmission to the UAV an expiration time of the coordinate information defining the determined boundaries of the surrounding area and coordinate information defining restricted areas contained within the boundaries of the surrounding area.

Further embodiments include a server configured to perform operations of the methods describe above. Further embodiments include a UAV having a navigation unit, a radio and a processor configured to perform operations of the methods describe above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
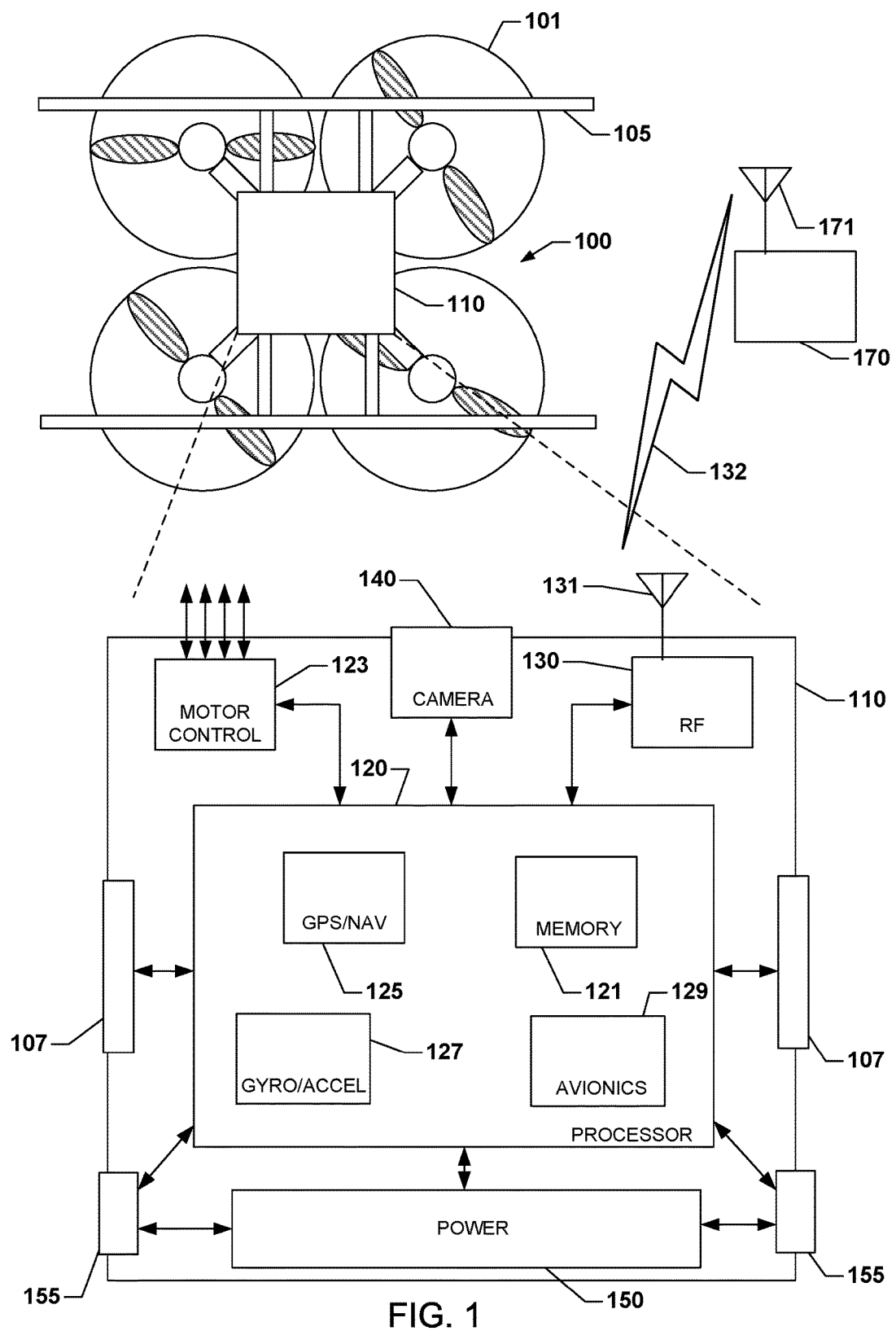
FIG. 1 is a diagram illustrating electrical and electronic components of a typical UAV including a wireless communication receiver suitable for use in the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments provide 'assistance data' to unmanned autonomous vehicles (UAVs), such as aerial UAVs, in an efficient manner that limits the update frequency by adjusting the size of a surrounding area that is provided in the assistance data and providing updates to the assistance data/surrounding area when required by the UAV as the UAV moves. In various embodiments, a UAV may provide a server with an estimated position of the UAV that includes an uncertainty, the server determines a surrounding area that includes the UAV and a number of Restricted Areas (RAs), and sends information to the UAV regarding the coordinates and restrictions of the RAs within the determined surrounding area along with information defining the boundaries of the surrounding area. The size and configuration of the surrounding area may be defined by the server based on the density of RAs and/or wireless transmission considerations (e.g., available bandwidth, periodicity of updates, etc.). The UAV may use the information on coordinates and restrictions of the RAs to avoid RAs or access RAs where and when permitted. Upon approaching a boundary of the surrounding area, the UAV may send a request to the server for an update on RAs. The UAV may also request an update on RAs when a "time to live" time or expiration time for the information provided by the server expires.

The UAV may also request an update on RAs for other reasons or upon other events. For example, the UAV may request updated surrounding area data from the server upon receiving a new mission assignment or flight path orders that may change the direction of travel of the UAV. As another example, the UAV may request updated surrounding area data upon detecting a change in weather or wind (which could change the UAV's actual or potential flight path and velocity). As another example, the UAV may request updated surrounding area data in response to detecting a condition within the UAV, such as the battery level is approaching a low-level threshold, a malfunction is detected in the vehicle, or other vehicle status requiring a change in flight plans. As another example, the UAV may request updated surrounding area data upon receiving new credentials or priorities (e.g., information that a toll or fee for accessing an RA has been paid or a change in mission has changed the priority access level of the UAV).

The server may set the size of the surrounding area as large enough to encompass expected or possible UAV movement (e.g., flight paths). For example, the UAV may send both a current position (with uncertainty) and a destination. The server may determine the surrounding area to encompass the destination if practical. In some embodiments, the server may prepare to send surrounding area updates along a path to the destination as the UAV progresses toward the destination.

In various embodiments, each RA may be defined based on various parameters. For each RA, information may be provided such as data defining the RA boundaries in three dimensions, restriction times, restriction conditions, and possibly other restriction information. In some instances, the RA boundaries may also change with time. The RA boundaries may be circular, polygonal, or irregular or a combination thereof. Surrounding area updates may also depend on changes in the RA parameters. For example, if a number of the RAs will be effective on or after a given time, the surrounding area may be updated accordingly.

In various embodiments, the server may define the size and/or shape the surrounding area based at least in part on the density of RAs in an operating area of the UAV, as well as the amount of information required to define each RA, in order to reduce the frequency at which UAVs request updates, thereby conserving communication channels used for communicating RA information to UAVs.

Various embodiments may thus enable a server providing RA information to UAVs to support a large number of UAVs operating simultaneously by eliminating the need for frequent uploads of RA information while limiting the amount of RA information that must be stored in each UAV at a given time. For example, when the RA density is high (e.g., in urban area), the server may define surrounding area size to be relatively small in terms of geographic dimensions, but including a number of RAs that may be defined based upon the amount of information required to define the RAs consistent with criteria for managing the frequency of uploads to UAVs, the size of memories in the UAVs, and/or the time required to communicate surrounding area updates to each UAV. However, when there are few RAs are present in a given region (e.g., rural/wilderness area) the server may define a large surrounding area size, reducing the frequency at which a UAV requests surrounding area updates. When there are no RAs in a given region, the server may transmit a largest appropriate surrounding area size, such a surrounding area that encompasses the entire travel range of the UAV (e.g., based on UAV model, battery charge state, wind direction, etc.).

Various embodiments may be useful with a variety of unmanned autonomous vehicles (UAVs), some example of which include aerial autonomous vehicles (e.g., UAVs), unmanned autonomous land vehicles, unmanned autonomous watercraft, and autonomous spacecraft. A UAV may be autonomous (self-navigating), remotely controlled, server controlled, beacon controlled, or may be controlled by a combination of control methods. Various embodiments may be particularly useful for aerial UAVs due to the high mobility, increasing applications and numbers of UAVs, as well as the presence of restricted airspace throughout the world. Therefore, various embodiments are described using aerial UAVs as an example application. However, such references, figures, and descriptions are intended merely as examples for purposes of describing various embodiments, and are not intended to limit the scope of the claims to aerial UAVs unless specifically recited in the claims.

Various embodiments facilitate the ability of UAVs to navigate in areas where RAs are present and enable the UAV to avoid or access geographic areas having operating restrictions, such as flight or over-flight restrictions. RAs may be defined for each type of UAV, such as restrictions on over-flights (e.g., airport approach paths, military bases, etc.) for aerial UAVs, restricted roads and land for terrestrial UAVs, and restricted waters for watercraft UAVs. RAs may be defined by geographic boundaries, such as latitude and longitude, as well as altitude for aerial UAVs or depth for watercraft UAVs (e.g., autonomous submarines). RAs may also be defined by particular locations, such as coordinates or address of facilities, buildings (airports, government buildings, plants, reactors, etc.), and a surrounding horizontal and vertical radius (e.g., airspace zones, altitudes, depths, etc.). RAs may be further defined by various restriction levels, times and days of restrictions, and conditions for access (e.g., permitted or prohibited uses, permitted UAVs, etc.). The access level of a UAV may permit or restrict access based on the various restrictions levels and conditions of the restricted areas. The access levels of the UAVs and the restriction levels of the restricted areas may be subject to change, which may become a factor in determining when to provide updates to the surrounding area. Further, each RA may have unique restrictions, such as standoff distances, altitudes, etc.

Thus, the type and amount of information that defines RAs may be extensive, and may differ for each RA. Further, the boundaries and restrictions defining some RAs may change periodically (e.g., daily) or dynamically (e.g., upon some events or decisions by owners of the area).

As used herein, the term Global Navigation Satellite System (GNSS) refers to any of a variety of satellite-aided navigation systems, such as Global Positioning System (GPS) deployed by the United States, GLONASS (GLObal NAvigation Satellite System) used by the Russian military, and Galileo for civilian use in the European Union, as well as terrestrial communication systems that augment satellite-based navigation signals or provide independent navigation information.

As an example, various embodiments may be utilized for providing RA information to aerial UAVs, of which an example is UAV 100 illustrated in FIG. 1. The UAV 100 may be configured to fly to a location or destination while navigating around RAs. The example UAV 100 illustrated in FIG. 1 is a "quad copter" having four horizontally configured rotary lift propellers 101 and motors fixed to a frame 105. The frame 105 may support a controller 110, landing skids and the propulsion motors, power source (power unit 150) (e.g., battery), payload securing mechanism (payload securing unit 107), and so on.

The UAV 100 may be provided with a control unit 110. The control unit 110 may include a processor 120, a radio 130, and a power unit 150. The processor 120 may include or be coupled to a memory unit 121 and a navigation unit 125. The processor 120 may be configured with processor-executable instructions to control flight and other operations the UAV 100, including operations of the various embodiments. In some embodiments, the processor 120 may be coupled to a payload securing unit 107 and landing sensors 155. The processor 120 may be powered from a power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor control unit 123 that is configured to manage the motors that drive the rotors 101.

Through control of the individual motors of the rotors 101, the UAV 100 may be controlled in flight as the UAV 100 progresses toward a destination. The processor 120 may receive data from a navigation unit 125 and use such data in order to determine the present position and orientation of the UAV 100, as well as the appropriate course towards the destination.

In some embodiments, the navigation unit 125 may include a GNSS receiver system (e.g., one or more GPS receivers) enabling the UAV 100 to navigate using GNSS signals. Alternatively or in addition, the navigation unit 125 may be equipped with radio navigation receivers for receiving navigation beacon or other signals from radio nodes, such as navigation beacons (e.g., very high frequency (VHF) omnidirectional range (VOR) beacons), Wi-Fi access points, cellular network sites, radio station, etc. In some embodiments, UAVs may navigate using navigation systems such as Global Navigation Satellite System (GNSS), Global Positioning System (GPS), etc. In some embodiments, the UAV may use an alternate source of positioning signals (i.e., other than GNSS, GPS, etc.). Because UAVs often fly at low altitudes (e.g., below 400 feet), the UAV may scan for local radio signals (e.g., Wi-Fi signals, Bluetooth signals, Cellular signals, etc.) associated with transmitters (e.g., beacons, Wi-Fi access points, Bluetooth beacons, small cells (pico-cells, femtocells, etc.), etc.) having known locations such as beacons or other signal sources within restricted or unrestricted areas near the flight path. The UAV 100 may use location information associated with the source of the alternate signals together with additional information (e.g., dead reckoning in combination with last trusted GNSS location, dead reckoning in combination with a position of the UAV takeoff zone, etc.) for positioning and navigation. Thus, in some embodiments the UAV 100 may navigate using a combination of navigation techniques, including dead-reckoning, camera-based recognition of the land features below the UAV (e.g., recognizing a road, landmarks, highway signage, etc.), etc. that may be used instead of or in combination with GNSS location determination and triangulation or trilateration based on known locations of detected wireless access points.

An avionics component 129 coupled to the processor 120 and/or the navigation unit 125 may be configured to provide flight control-related information such as altitude, attitude, airspeed, heading and similar information that the navigation unit 125 may use for navigation purposes, such as dead reckoning between GNSS position updates. The avionics component 129 may include or receive data from a gyro/accelerometer unit 127 that provides data regarding the orientation and accelerations of the UAV 100 that may be used in navigation calculations.

The processor 120 and/or the navigation unit 125 may be configured to communicate with a server (e.g., 170) through a wireless connection (e.g., a cellular data network) via a radio 130 to receive assistance data from the server and to provide UAV position information and/or other information to the server. The radio 130 may be configured to receive communication signals, navigation signals, signals from aviation navigation facilities, etc., and provide such signals to the processor 120 and/or the navigation unit 125 to assist in UAV navigation.

In some embodiments, the navigation unit 125 may use signals received from recognizable radio frequency (RF) emitters (e.g., AM/FM radio stations, Wi-Fi access points, and cellular network base stations) on the ground. The locations, unique identifiers, single strengths, frequencies, and other characteristic information of such RF emitters may be stored in a database and used to determine position (e.g., via triangulation and/or trilateration) when RF signals are received by the radio 130. Such a database of RF emitters may be stored in the memory unit 121 of the UAV 100, in a ground-based server in communication with the processor 120 via a wireless communication link, or in a combination of the memory unit 121 and a ground-based server. Navigating using information about RF emitters may use any of a number of conventional methods. For example, upon receiving an RF signal via the radio 130, the processor 120 may obtain the signals unique identifier (e.g., a service sector identification (SSID), a media access control (MAC) address, radio station call sign, cell ID, etc.), and use that information to obtain the ground coordinates and signal strength of the detected RF emitter from the database of RF emitter characteristics. Using locations of three or more RF emitters detected by the radio 130, the processor 120 may determine a more precise position via trilateration.

Estimates of UAV position based on received ground-based RF emitters may be combined with position information from a GNSS receiver to provide more precise and reliable position estimates than achievable with either method alone.

The processor 120 may use the radio 130 to conduct wireless communications with a variety of wireless communication wireless communication devices 170 such as a server, a beacon, smartphone, tablet, or other device with which the UAV 100 may be in communication. A bi-directional wireless communication link 132 may be established between transmit/receive antenna 131 of the radio 130 and transmit/receive antenna 171 of the wireless communication device 170. For example, the wireless communication device 170 may be a beacon that controls access to a restricted area as described herein. In an example, the wireless communication device 170 may be a cellular network base station or cell tower. The radio 130 may be configured to support multiple connections with different wireless communication devices 170 having different radio access technologies. In some embodiments, the wireless communication device 170 may be connected to a server or provides access to a server. In an example, the wireless communication device 170 may be a server, such as a server of a UAV operator, a server of a third party service (e.g., package delivery, billing, etc.), a server of an operator of a restricted area, etc. The UAV 100 may communicate with a server through an intermediate communication link such as one or more network nodes or other communication devices.

In some embodiments, the radio 130 may be configured to switch between a cellular connection and a Wi-Fi connection depending on the position and altitude of the UAV 100. For example, while in flight at an altitude designated for UAV traffic, the radio 130 may communicate with a cellular infrastructure in order to maintain communications with a server (e.g., 170). An example of a flight altitude for the UAV 100 may be at around 400 feet or less, such as may be designated by a government authority (e.g., FAA) for UAV flight traffic. At this altitude, it may be difficult to establish communication with some of the wireless communication devices 170 using short-range radio communication links (e.g., Wi-Fi). Therefore, communications with other wireless communication devices 170 may be established using cellular telephone networks while the UAV 100 is at flight altitude. Communication between the radio 130 and the wireless communication device 170 may transition to a short-range communication link (e.g., Wi-Fi or Bluetooth) when the UAV 100 moves closer to the wireless communication device 170.

In the various embodiments, the wireless communication device 170 may be associated with an area in which UAV operations are prohibited or restricted, referred to generally herein as a "restricted area" or RA. For example, the wireless communication device 170 may be wireless access point or cellular network base station coupled to a server configured to communicate information regarding RAs. The server may use the wireless communication device 170 to communicate with the UAV 100 when the UAV 100 is in or near the restricted area, or send additional information associated with the restricted area to the UAV 100 through a data connection established with the UAV 100 (e.g., through a cellular data connection maintained by the UAV 100 with a cellular network).

The wireless communication device 170 may also be a server associated with the operator of the UAV 100, which communicates with the UAV 100 through a local access node or through a data connection maintained through a cellular connection.

While the various components of the control unit 110 are illustrated in FIG. 1 as separate components, some or all of the components (e.g., the processor 120, the motor control unit 123, the radio 130, and other units) may be integrated together in a single device or unit, such as a system-on-chip.

Figure 2:
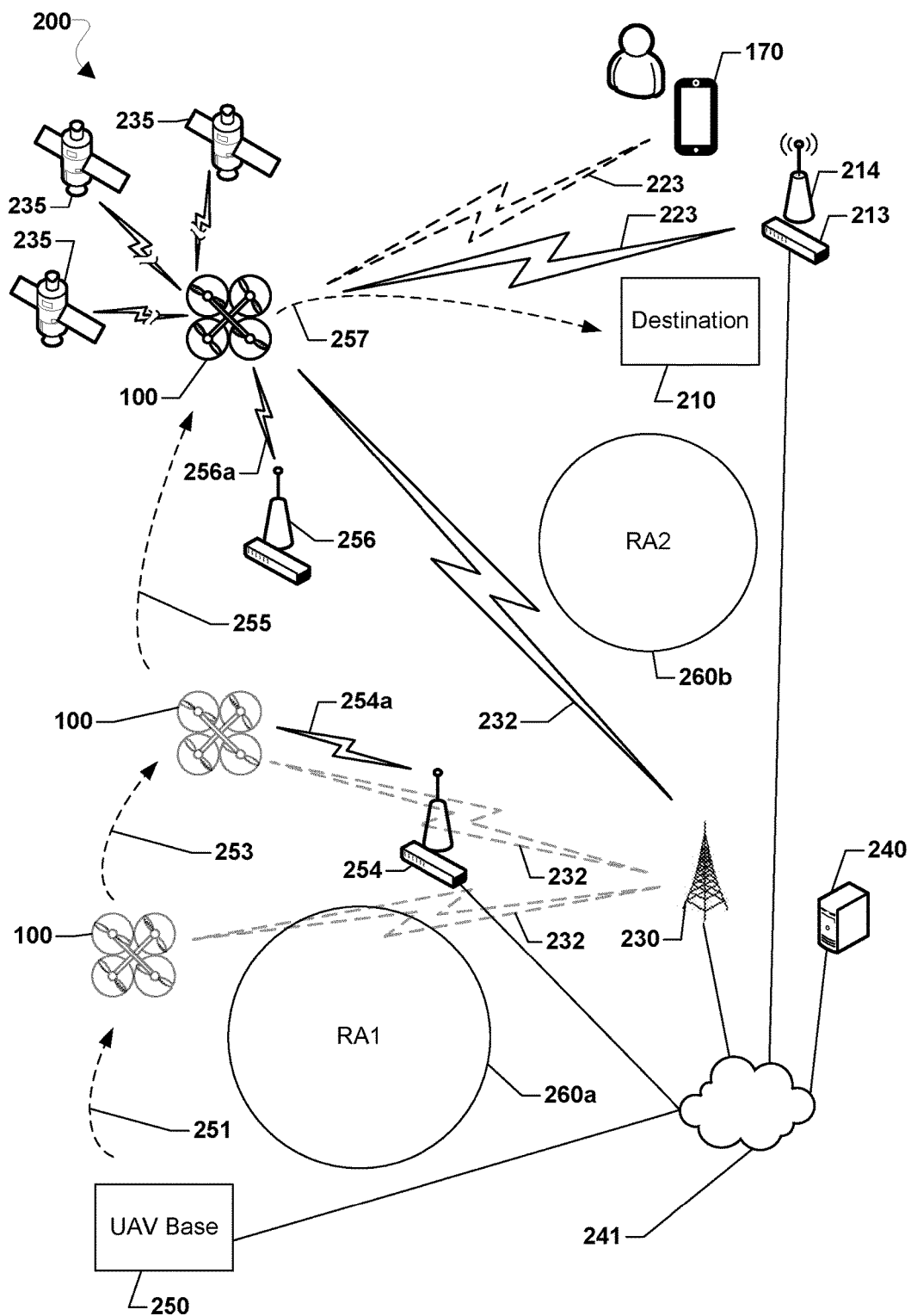
FIG. 2 is a diagram illustrating communication links in a UAV system between a UAV and system components in the various embodiments.

An operating environment 200 for a UAV (e.g., the UAV 100 in FIG. 1) may include a destination 210 and a UAV base 250 as illustrated in FIG. 2. The UAV base 250 may be a "home" location for the UAV 100 or any predetermined or designated starting point for a transit by the UAV 100. In some embodiments, the UAV base 250 may also be a predetermined or designated area to which the UAV 100 may be configured to return. With reference to FIGS. 1-2, information, such as the coordinates of the destination 210, may be provided to the UAV 100 by a server 240 (e.g., wireless communication device 170) or may be pre-programmed. In some embodiments, the UAV 100 may be programmed with the coordinates of UAV's destination 210, such as when the UAV 100 is assigned for a mission or while the UAV 100 is in-flight. In some embodiments, the destination 210 may be coordinates of a loiter location where the UAV 100 may proceed to and maintain monitoring or other operations within the area of the destination 210.

The UAV 100 may establish and maintain communication with the server 240 while the UAV 100 is at the UAV base 250 to facilitate the dispatch of the UAV 100 to the destination 210 and to communicate with the UAV 100 during flight. In various embodiments, the UAV 100 may establish a direct connection with the server 240 while at the UAV base 250 and/or may communicate with the server 240 through a cellular data network connection. For example, the UAV 100 may establish a wireless connection 232 with a cellular infrastructure component 230 of a cellular service provider. The wireless connection 232 may be a data connection that provides a connection with the server 240 through a public network, such as the Internet 241, while the UAV 100 is on the ground and/or in flight. The UAV 100 may establish multiple wireless connections simultaneously, such as a wireless connection 223 with a wireless access point 213 having an antenna 214. The wireless access point 213 may provide an independent connection to the Internet 241 through which the UAV processor 120 may access the server 240. The wireless access point 213 may be any wireless access point between the UAV base 250 and the destination 210, including a beacon associated with a restricted area.

Upon receiving assistance data including a surrounding area, restricted area list, etc., and/or information regarding the destination 210 for the UAV 100, the UAV 100 may be dispatched from the UAV base 250 to fly to the destination 210 along a planned path 251 (or first leg) or an ad-hoc flight plan that navigates with respect to the restricted areas. In either case, the UAV 100 may engage in flight with respect to any restricted areas provided by the server 240, such as in connection with assistance data, surrounding area, etc. The UAV 100 may determine the route to the destination 210 based on various constraints, such as ground safety considerations, altitude restrictions, obstacles (e.g., buildings, mountains, towers, etc.), weather conditions, retrievability considerations (e.g., areas in which the UAV 100 may be difficult to retrieve in case of landing in such areas), efficiencies (e.g., most fuel efficient route, shortest distances to travel), access to the restricted areas 260a, 260b and/or the need to avoid restricted areas 260a, 260b. For example, in the event the UAV 100 lands or crashes while traveling to or from a destination, the UAV 100 may be configured to do so in an area that will be least likely to cause safety issues to humans or damage to property, and/or in an area where it can be most easily retrieved, and so on. The UAV 100 may use GNSS signals from GNSS satellites 235 to determine progress toward the destination 210 of the UAV 100, including progress towards waypoints defining the planned flight path of the UAV 100.

The UAV 100 may establish the connection 232 with the cellular infrastructure component 230 to facilitate communications with the server 240 through the Internet 241 while in flight. In various embodiments, the UAV 100 may use information from the server 240 to avoid entering restricted areas 260a, 260b or to gain conditional access to the restricted areas 260a, 260b.

The UAV 100 may receive signals from wireless communication devices 254, 256 (e.g., 170) through respective wireless signals 254a, 256a as it progresses toward the destination 210. In some embodiments, the wireless communication devices 254, 256 may be beacons that are associated with one or more restricted areas 260a, 260b. In various embodiments, the information may be known to the server 240 when the server 240 provides the assistance data including restricted area information to the UAV 100.

The wireless signals 254a, 256a may provide information about the respective wireless communication devices 254, 256, such as an SSID, a MAC address, a cell tower ID, etc. The wireless signals 254a, 256a may indicate or confirm to the UAV 100 that the respective areas are restricted and may contain additional information, such as updated boundary coordinate information for the respective restricted areas and/or information regarding conditional access. One or more of the wireless signals 254a, 256a may prompt the UAV 100 to provide identifying information that may include an identifier of the UAV 100 and an access level for the UAV 100 related to whether the UAV is permitted to enter or transit the restricted areas 260a, 260b.

While in flight, the UAV 100 may maintain the wireless connection 232 with the server 240 through the cellular infrastructure component 230 and the Internet 241. The server 240 may provide assistance data or updated assistance data through the connection through the infrastructure component 230. In some embodiments, the UAV 100 may obtain the assistance data from the server 240 through a connection one or more of the wireless communication devices 254, 256.

In some embodiments, based on information received from the server 240, the UAV 100 may avoid the restricted area 260a and proceed toward the destination 210 on a second leg 253. The UAV 100 may make contact with the wireless communication device 254 when the UAV's radio 130 begins receiving signals 254a from the wireless communication device 254. The UAV 100 may determine the location of the wireless communication device 254 by obtaining identification (e.g., SSID) and possibly other information about the wireless communication device 254, and obtain the access point location by sending the obtained access point information to a server of a location information services provider. Coordinates of the wireless communication device 254 returned from the location information services provider may be used by the UAV processor 120 to confirm the current location and bearing of the UAV 100. In the event the determined the current location and bearing information indicates that the UAV 100 is off course, the UAV 100 may make course corrections as the UAV 100 proceeds to the destination 210 along a third leg 255. In some embodiments, the UAV processor 120 may determine that it should distrust the GNSS system-determined location as such information may be corrupted by pirate or jamming signals, and take corrective actions, such as landing, returning to UAV base 250, or falling back onto dead-reckoning navigation in combination with alternative navigation. The position information determination operations may be repeated each time a new wireless communication device 256 is encountered.

In some embodiments, as the UAV 100 approaches the destination 210 along a final leg 257, a communication link may be established with the wireless access point 213 and/or with a wireless device 170 at or near a landing zone. For example, the UAV 100 may detect a wireless signal 223 from smart phone wireless device 170 of a person awaiting the UAV 100, and conduct final location determination operations with the wireless device 170 information. Alternatively or additionally, the UAV 100 may use the wireless connection 223 to establish a connection with the server 240, such as through the Internet 241 by way of the wireless device 213. Alternatively or additionally, the UAV 100 may use the wireless connection 232 to establish a connection with the server 240, such as through the Internet 241 by way of a cellular infrastructure component 230. Through such connections the UAV 100 may receive additional navigational, status, or other information useful for supporting flight operations including, for example, modified destination information, modified route information, weather information, distance information, flight restriction information, obstacle information, or other information that may be useful for operation of the UAV 100. For example, a new destination may be assigned and the UAV 100 may be required to follow a new flight path to the new destination. The new destination information may be conveyed to the UAV 100 through one or more wireless connections 223, 232 along with additional information regarding restricted areas, conditional access restrictions, and so on.

Figure 3A:
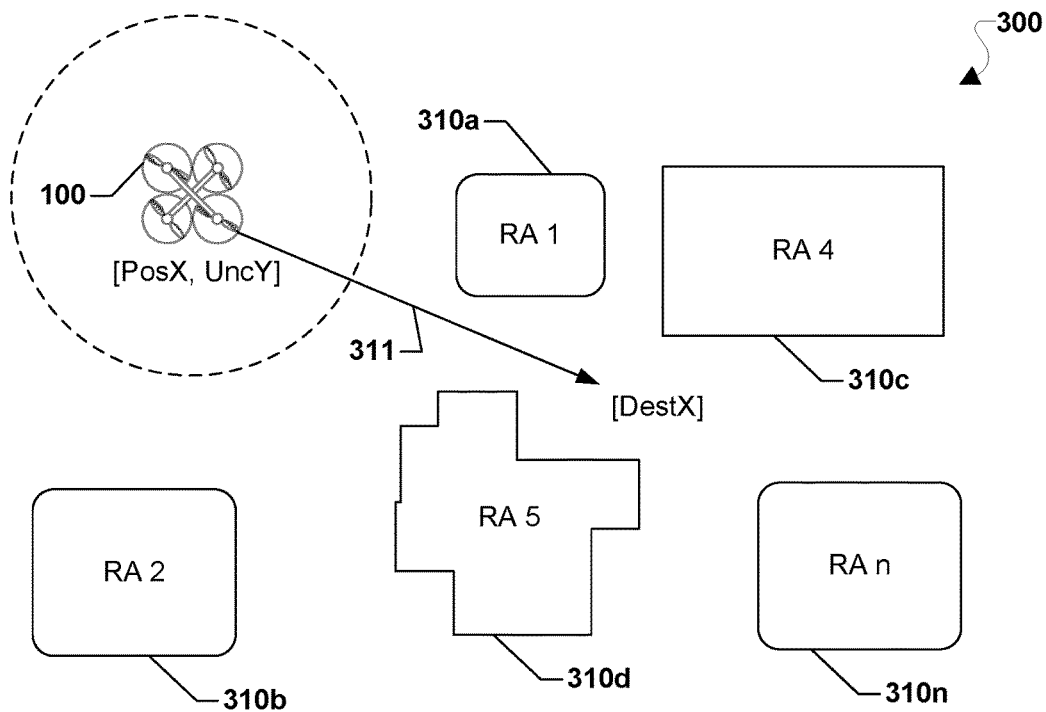
FIG. 3A is a diagram illustrating navigation among restricted areas by a UAV in the various embodiments.

FIG. 3A illustrates a navigation scenario 300 of a UAV (which may correspond to the UAV 100 in FIGS. 1-2) as the UAV 100 approaches an area in which several restricted areas 310a-310d ... 310n are present on or near a flight path 311 according to various embodiments. With reference to FIGS. 1-3A, in some embodiments, the UAV 100 may have received restricted area information regarding one or more of the restricted areas RA 1-RA n 310a-310d ... 310n from communications with the server 240. For example, the restricted area information for the restricted area RA 1-RA n 310a-310d ... 310n may include an avoidance distance requiring the UAV 100 to plan the path 311, such as from a current position with uncertainty (e.g., [PosX, UncY]) to a destination (e.g., [DestX]), so as to remain outside of the avoidance distance from the restricted area. The UAV 100 may proceed along the flight path 311 that avoids entering the restricted areas RA 1-RA n 310a-310d ... 310n. In some embodiments, the UAV 100 may access one or more of the restricted areas RA 1-RA n 310a-310d ... 310n. Challenges arise, however, in that the UAV 100 may have difficulty in obtaining information about the RAs in a manner that does not result in the UAV 100 obtaining more information than is necessary or requesting information too frequently (e.g., when the density of RAs is sparse). The UAV 100 may also be constrained in the amount of information about RAs that can be stored, such as through memory capacity constraints, bandwidth constraints, and/or that can be received at one time, such as through bandwidth constraints.

Figure 3B:
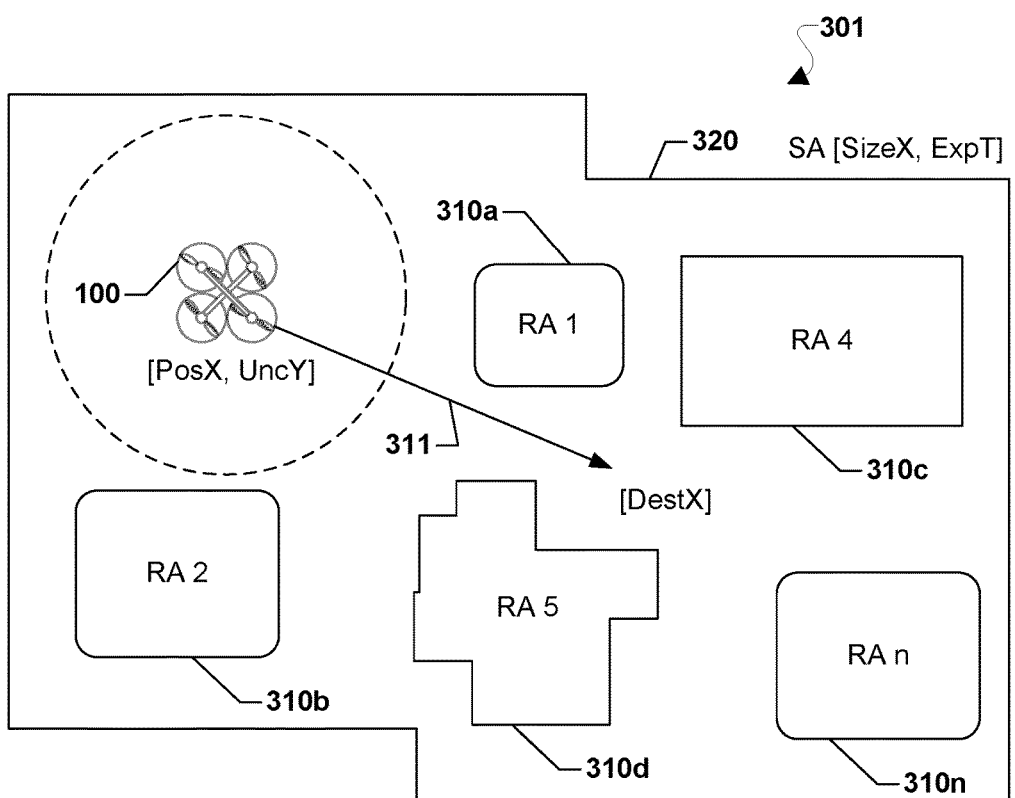
FIG. 3B is a diagram illustrating navigation in a surrounding area among restricted areas by a UAV in the various embodiments.

FIG. 3B illustrates a navigation scenario 301 of the UAV 100 within a surrounding area 320 in which several restricted areas RA 1-RA n 310a-310d ... 310n are present on or near a flight path 311 according to various embodiments. With reference to FIGS. 1-3B, in various embodiments, the UAV 100 may receive the surrounding area 320 including information such as a size (e.g., SizeX), an expiration time (e.g., ExpT), and a list of restricted areas from the server 240. As will be described in greater detail herein, the server 240 may determine or otherwise set a size surrounding area 320 to encompass a number of the restricted areas 310 taking into account various factors such as frequency of update requests, size of UAV memory (or available memory), bandwidth of the communication channel between the UAV 100 and the server 240.

In various embodiments, the server 240 may determine the expiration time ExpT for the surrounding area 320 based on the frequency of change of the RA information. For example, the number of RAs within the surrounding area 320 may change over time based on changing conditions of the no-fly zones or restrictions in the RAs. In other words, based on a time of day, week, month, year, season, etc. or other regularly occurring conditions, RAs may change from restricted to unrestricted flight. When the RA restrictions are not in effect, one or more of the RAs may not appear on the list of RAs corresponding to the surrounding area 320. Alternatively, the RAs having restrictions that are not in effect may nevertheless be provided with additional information as to the times that restrictions are in effect. In some embodiments, RAs may have periodic restriction parameters that require updating. Thus, the expiration time of the surrounding area and RA information may be set to coincide with changes to the RA information. As the UAV 100 proceeds through the surrounding area 320, the UAV may determine [PosX, UncY] and determine whether the UAV 100 is near a boundary of the surrounding area 320. The UAV 100 may also take note of a current speed and direction (including rate of ascent or descent). When the UAV 100 determines that the current UAV position and the uncertainty exceed the boundary of the surrounding area 320, the UAV 100 may request an update of the assistance data from a server. In other words, the UAV 100 may request an update of the surrounding area 320 including an updated list of the RAs (e.g., RA 1-RA n 310a-310d ... 310n).

Figure 3C:
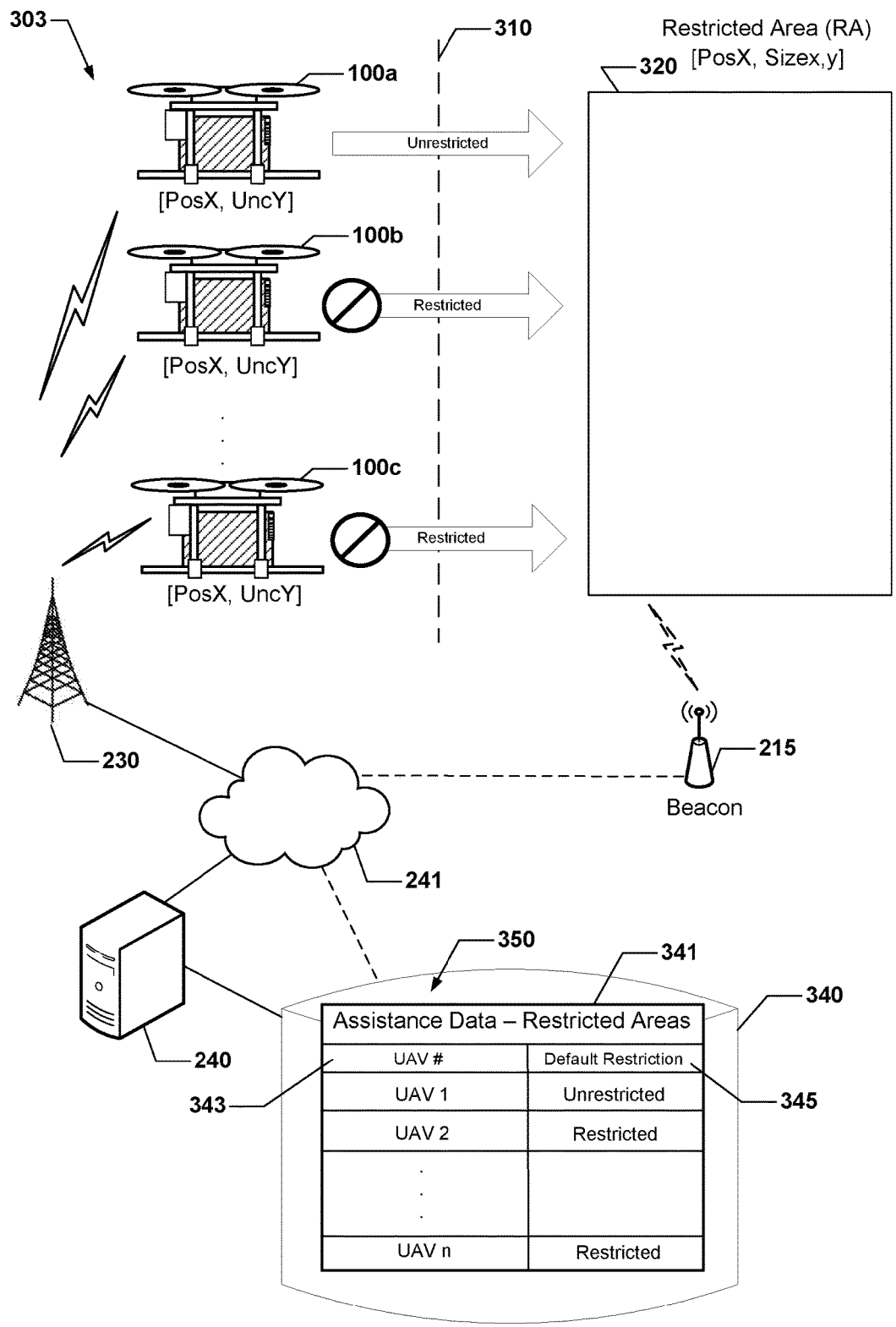
FIG. 3C is a diagram illustrating navigation in a surrounding area using assistance data in the various embodiments.

FIG. 3C illustrates a scenario 303 in which UAVs, such as UAVs 100a-100c (which may correspond to the UAV 100 in FIGS. 1-3B), may receive assistance data 350 from the server 240 according to various embodiments. With reference to FIGS. 1-3C, in various embodiments, the UAVs 100a-100c may be conducting communication with the server 240, such as through cellular infrastructure component 230. Alternatively or additionally, the UAVs 100a-100c may communicate with the server 240 through a beacon device 215. The UAVs 100a-100c may communicate with the server 240 by way of the Internet 241.

The server 240 may be coupled to a data storage device 340, which may store a database 341 containing the assistance data 350. The data storage device 340 may be a local storage device (e.g., local to the server 240) or may be a remote storage device (e.g., a cloud storage device). In various embodiments, the assistance data 350 may be stored on an individual basis for each UAV 100a-100c. For example, the database 341 may store the assistance data 350 based on a UAV number 343 and may include a default restriction 345 for the given UAV 100a-100c. With reference to the database 341, the UAV 100a may be unrestricted with regard to the restricted area 310. In this example, the restricted area 310 may not appear in the list of RAs provided with the assistance data. The UAV 100b may be restricted from access to the RA 310. Thus, the RA 310 including the position (e.g., PosX) and size (e.g., Size x, y) of the RA 310 and any other information relevant to the RA 310. The RA 310 may have a regular or irregular shape. Therefore, the position and size information of the RA 310 may include coordinate information that defines the shape of the RA 310. The information for the RA 310 may also include altitude information for RAs that involve restricted airspace above the ground. The UAV 100c may be restricted with regard to the restricted area 310. Alternatively or additionally, in some embodiments, the individual maintenance of the assistance data 350 by UAV, the assistance data may be based on UAV type, UAV group, UAV operator, or other collective characteristic. Thus, the UAVs 100a-100c may receive the assistance data from the server 240 by way of the database 341, such as with assistance data. As discussed herein, the assistance data may include surrounding area with a list of RAs and RA information.

Figure 3D:
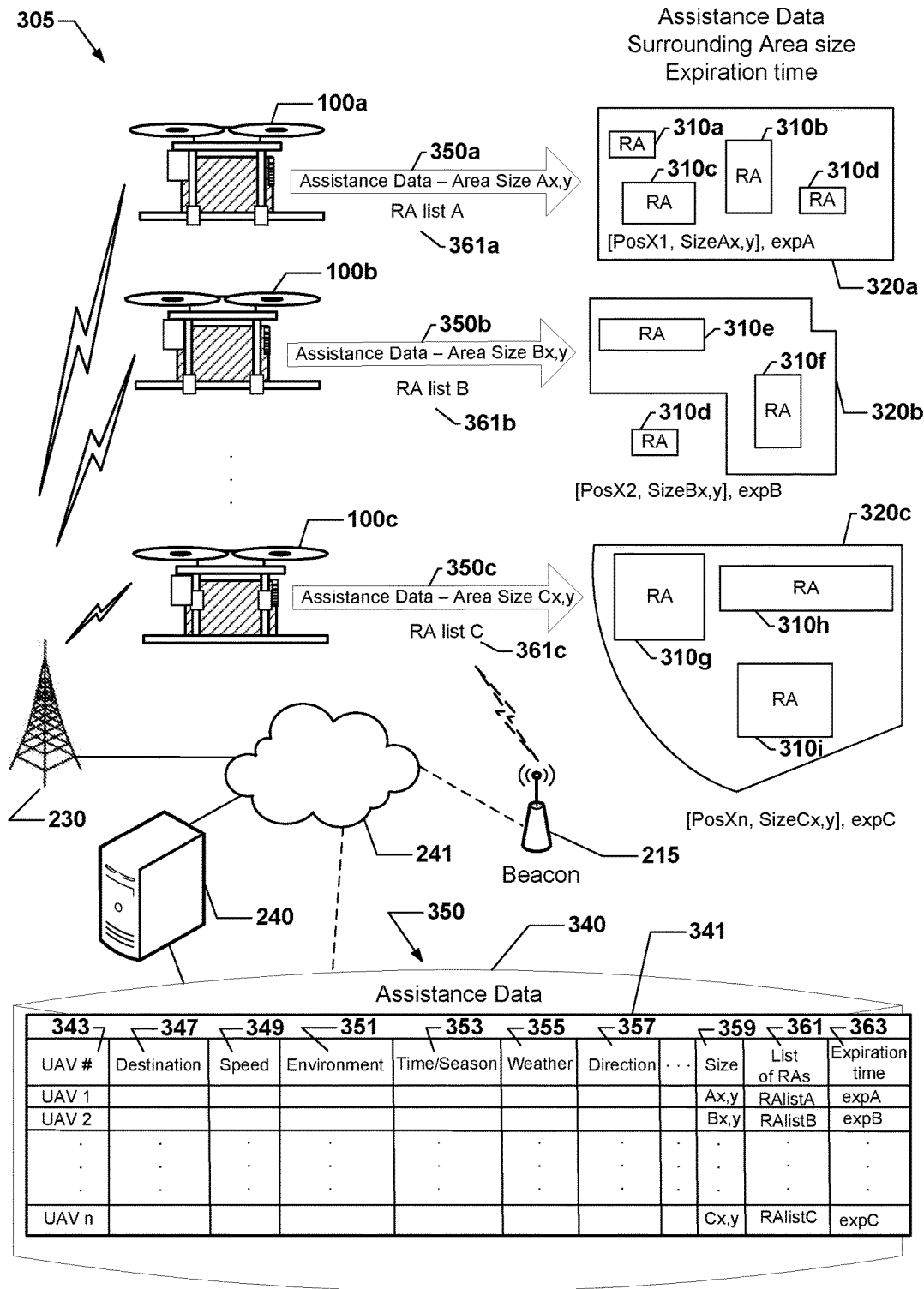
FIG. 3D is a diagram further navigation in a surrounding area using time-sensitive assistance data in the various embodiments.

FIG. 3D illustrates a scenario 305 in which UAVs, such as the UAVs 100a-100c, may receive the assistance data 350 from the server 240 according to various embodiments. With reference to FIGS. 1-3D, in various embodiments, the UAVs 100a-100c may be conducting communication with the server 240, such as through cellular infrastructure component 230. Alternatively or additionally, the UAVs 100a-100b may communicate with the server 240 through the beacon device 215. The UAVs 100a-100c may communicate with the server 240 by way of the Internet 241.

In various embodiments, the server 240 may be coupled to the data storage device 340, which may store the database 341 containing the assistance data 350. The data storage device 340 may be a local storage device (e.g., local to the server 240) or may be a remote storage device (e.g., a cloud storage device). In various embodiments, in addition to the default restrictions 345 discussed herein, the database 341 may store additional elements of the assistance data 350. For example, the database 341 may store destination data 347, speed data 349, environment data 351, time/season data 353, weather data 355, and direction data 357. These data elements may correspond to the same or similar data elements that may be maintained and stored on the UAV 100a-100c.

In various embodiments, the data elements may be used by the server 240, such as by a processor of the server 240, to determine a size of a surrounding area (e.g., 320, 320a-320c) in order to determine the RAs that are to be identified to the UAV 100. Defining each RA requires a certain amount of data defining boundaries in three dimensions, restriction times, and possibly other restriction information. Thus, the density of RAs in an operating area may affect the size of the surrounding area that can be transmitted to the UAV within a desired transmission size. Thus, when there are few or no RAs in a given region (e.g., wilderness area), the surrounding area size may be set relatively large, reducing the frequency at which the UAV 100a-100c needs to request surrounding area updates. However, when the RA density is high (e.g., in urban area), the server 240 may set the surrounding area size relatively small to keep the size of the data file of the RA information from exceeding what can be transmitted to a UAV efficiently. With a smaller surrounding area, the UAV 100a-100c will need to request updates frequently. Also, if the UAV 100a-100c is moving rapidly through the surrounding area, the UAV 100a-100c will need to request updates more frequently. For example, if the destination data 347 and the speed data 349 indicate that the UAV 100a-100c is travelling rapidly in an area sparsely populated with restricted areas, the server 240 may set the size of the surrounding area to be relatively large. Correspondingly, a list of restricted areas may be relatively small. Further, the server 240 may determine an expiration time of the surrounding area. Such a determination may involve a determination of the rate of change of the status of the restricted areas within the surrounding area. Thus, the database 341 may store coordinates or a size 359 of surrounding areas, a list of restricted areas 361 in each surrounding area, and an expiration time 363 for each surrounding area.

In an example, the UAV 100a may receive assistance data 350a from the server 240. The assistance data 350a may include a surrounding area 320a having a position, size, and expiration time (e.g., [PosX1, SizeAx, y], expA). In various embodiments, the size of the surrounding area 320a may be a rectangular shape. In some embodiments, the size of the surrounding area 320a may be a polygonal shape other than a rectangle, a circular shape, a combination of geometric shapes, or an irregular shape. Thus, the size data sent with the assistance data 350a may specify the boundaries of the surrounding area 320a. In some embodiments, the assistance data 350a may contain information that specifies the approximate boundaries of the surrounding area 320a (e.g., within a tolerance). In some embodiments, the tolerance of the information defining the boundaries of the surrounding area 320a may depend on the overall area encompassed by the surrounding area 320a or other factors.

The surrounding area 320a may further include an RA list A 361a containing restricted areas 310a-310d. The RA list A 361a may include the position (e.g., PosX) and size (e.g., Size x, y) of each of the RAs 310a-310d and any other information relevant to the RAs 310a-310d. The RAs 310a-310d may have a regular or irregular shape. Therefore, the position and size information of the RAs 310a-310d in the RA list A 361a may include coordinate information that defines the shape of each of the RAs 310a-310d. It should also be noted that the information for the RAs 310a-310d may also include altitude information for one or more of the RAs 310a-310d that involve restricted airspace above the ground.

In a further example, the UAV 100b may receive assistance data 350b from the server 240. The assistance data 350b may include a surrounding area 320b having a position, size and expiration time (e.g., [PosX2, SizeBx, y], expB). In various embodiments, the size of the surrounding area 320b may be a rectangular shape. In some embodiments, the size of the surrounding area 320b may be a polygonal shape other than a rectangle, a circular shape, a combination of geometric shapes, or an irregular shape. Thus, the size data sent with the assistance data 350b may specify the boundaries of the surrounding area 320b. In some embodiments, the assistance data 350b may contain information that specifies the approximate boundaries of the surrounding area 320b (e.g., within a tolerance). In some embodiments, the tolerance of the information defining the boundaries of the surrounding area 320a may depend on the overall area encompassed by the surrounding area 320a or other factors (e.g., resolution).

The surrounding area 320b may further include an RA list B 361b containing restricted areas 310e, 310f. The RA list B 361b may include the position (e.g., PosX) and size (e.g., Size x, y) of each of the RAs 310e, 310f and any other information relevant to the RAs 310e, 310f. The RAs 310e, 310f may have a regular or irregular shape. Therefore, the position and size information of the RAs 310e, 310f in the RA list A 361b may include coordinate information that defines the shape of each of the RAs 310e, 310f. It should also be noted that the information for the RAs 310e, 310f may also include altitude information for one or more of the RAs 310e, 310f that involve restricted airspace above the ground.

In a further example, the UAV 100c may receive assistance data 350c from the server 240. The assistance data 350c may include a surrounding area 320c having a position, size, and expiration time (e.g., [PosXn, SizeCx, y], expC). In various embodiments, the size of the surrounding area 320c may be a rectangular shape. In some embodiments, the size of the surrounding area 320c may be a polygonal shape other than a rectangle, a circular shape, a combination of geometric shapes, or an irregular shape. Thus, the size data sent with the assistance data 350c may specify the boundaries of the surrounding area 320c. In some embodiments, the assistance data 350c may contain information that specifies the approximate boundaries of the surrounding area 320c (e.g., within a tolerance). In some embodiments, the tolerance of the information defining the boundaries of the surrounding area 320c may depend on the overall area encompassed by the surrounding area 320c or other factors.

The surrounding area 320c may further include an RA list C 361c containing restricted areas (RAs) 310g-310i. The RA list C 361c may include the position (e.g., PosX) and size (e.g., Size x, y) of each of the RAs 310g-310i and any other information relevant to the RAs 310g-310i. The RAs 310g-310i may have a regular or irregular shape. Therefore, the position and size information of the RAs 310g-310i in the RA list C 361c may include coordinate information that defines the shape of each of the RAs 310g-310i. It should also be noted that the information for the RAs 310g-310i may also include altitude information for one or more of the RAs 310g-310i that involve restricted airspace above the ground.

As also illustrated in 320b, a surrounding area transmitted to a UAV may not include all restricted areas equal distant from the UAV. For example, the surrounding area 320b may be configured with boundaries limited by a flight plan or other condition (e.g., weather, an obstacle, a low-battery state, etc.) such that a relatively nearby RA 310d is not included. For example, if the surrounding area 320b had been configured as a square encompassing RA 310e and 310f, then RA 310d would have been included. If the UAV 100b approaches RA 310d, the UAV would first have to cross a boundary of the surrounding area 320b, in which case the UAV 100b would request an updated surrounding area, which may then include RA 310d.

Figure 4A:
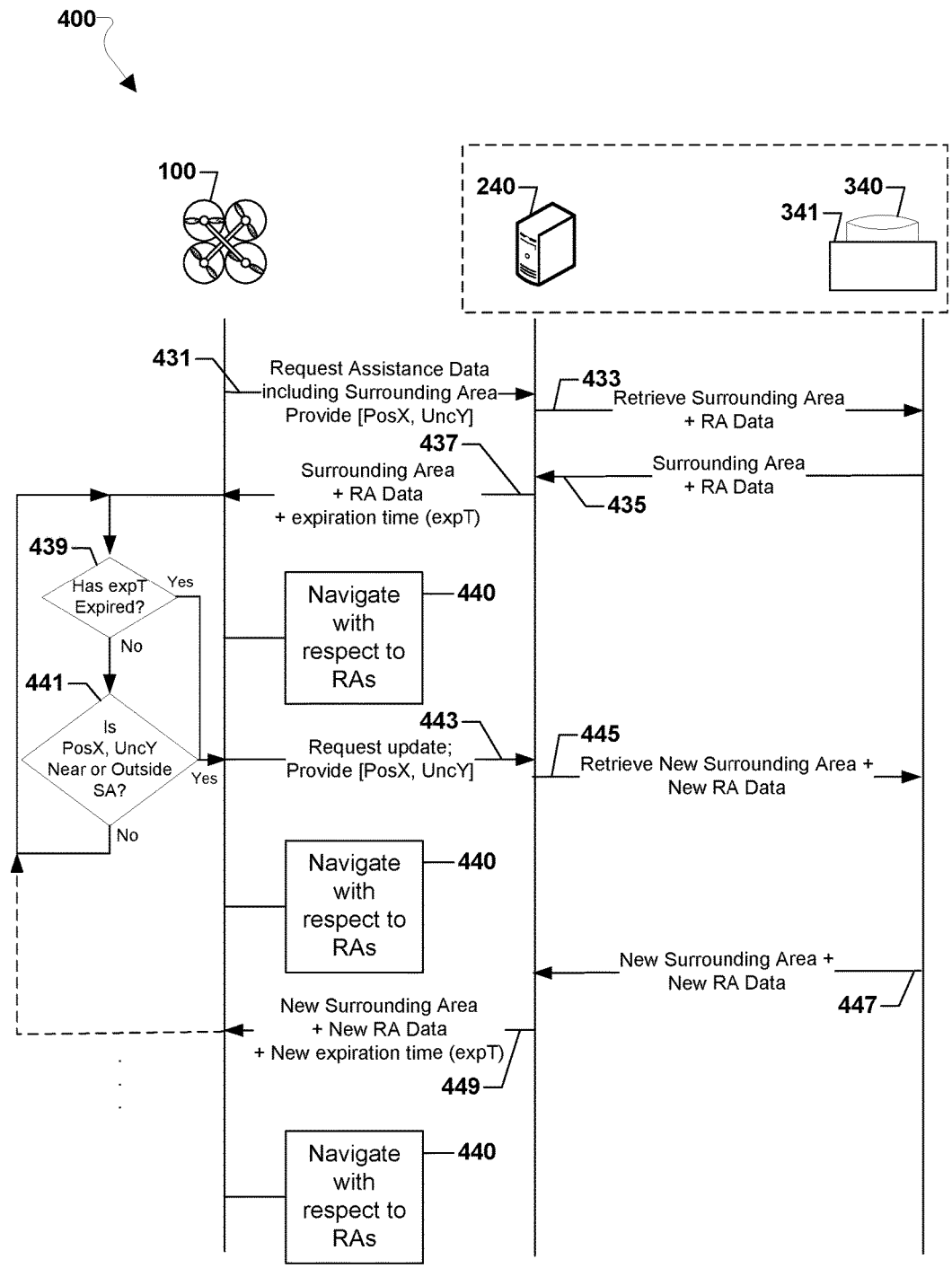
FIG. 4A is a message flow diagram illustrating messages exchanged between a UAV, a server and data store in the various embodiments.

FIG. 4A illustrates message flows 400 between components of a system for providing assistance data including a UAV (e.g., 100, 100a-100c in FIGS. 1-3D), a server (e.g., 240), and a database (e.g., 341) of assistance data stored on a data storage device (e.g., 340) according to various embodiments. With reference to FIGS. 1A-4A, before and/or during flight operations, the UAV 100 may send a message 431 to the server 240. The message 431 transmitted by the UAV 100 to the server 240 may be a request for assistance data, such as a surrounding area in which the UAV 100 may navigate. The message 431 may include a position of the UAV 100 (e.g., [PosX, UncY]) to enable the server 240 to identify restricted areas near the UAV 100. In response to receiving the message 431, the server 240 may send a message 433 to the data storage device 340 and/or the database 341 (or may perform a retrieval operation), to retrieve the assistance data, such as the surrounding area and restricted area data (e.g., list of restricted areas). In response to receiving the message 433 (or performing the retrieval operation), the data storage device 340 may provide a message 435 to the server 240 containing the retrieved assistance data. The message 435 may contain the surrounding area information including the list of restricted areas as described herein.

In response to the message 435 containing the retrieved assistance data, the server 240 may send a message 437 to the UAV 100. The message 437 may contain the assistance data, including the surrounding area information, the restricted area list, and an expiration time (ExpT) for the surrounding area information. The UAV 100 may navigate with respect to the RAs provided in the assistance data in block 440.

In determination block 439 (in response to receiving the message 437), the UAV 100, such as a processor of the UAV 100, may determine whether the expiration time has expired. In response to determining that the expiration time has not expired (i.e., determination block 439="no") the processor of the UAV 100 may proceed to determination block 441. Meanwhile, the UAV 100 may continue to navigate with respect to the RAs in block 440.

In determination block 441, the processor of the UAV 100 may determine whether the position of the UAV 100, including the uncertainty in the position, is near or outside the boundary of the surrounding area. Determining whether the UAV 100 is near a surrounding area boundary may take into account any error in the current position information (e.g., by extending a circle about the position coordinates with a radius determined based on the uncertainty in the position data). Additionally, determining whether the UAV 100 is near a surrounding area boundary may take into account the distance that the UAV 100 could travel within a predetermined or typical response time of the server 240. This additional range about the position coordinates of the UAV 100 may provide sufficient time before a surrounding area boundary could be reached for the UAV 100 to request and receive an update from the server 240 based on the current or maximum velocity of the UAV 100 and typical or worst case response times of the server 240. For example, the additional distance may be calculated based on the travel direction and speed of the UAV 100 multiplied by a predetermined duration for requesting an update, receiving the update, and then the updated surrounding area sufficient to adjust a current flight path may be processed if necessary. In response to determining that the position of the UAV 100 plus an uncertainty remains within the boundary of the surrounding area (i.e., determination block 441="No"), the processor of the UAV 100 may continue to determine whether the expiration time has expired in determination block 439.

In response to determining that the expiration time has expired (i.e., determination block 439="Yes") or that the position of the UAV 100 plus the uncertainty is near or outside the boundary of the surrounding area (i.e., determination block 441="Yes"), the processor of the UAV 100 may send a message 443 to the server 240 requesting updated information regarding the surrounding area and restricted areas. The message 443 requesting the update from the server 240 may provide a position of the UAV 100. The UAV 100 may also transmit an update request message 443 for other reasons or upon other events (e.g., upon receiving a new mission assignment, upon detecting a change in weather, in response to a battery level or other vehicle status, upon receiving new credentials or priorities, etc.). Thus, the update request message 443 may also include information regarding the reason that the UAV 100 is requesting the update.

In response to the message 443, the server 240 may send a message 445 to the data storage device 340 and/or the database 341 (or may perform a retrieval operation), to retrieve the updated assistance data, such as the new surrounding area and new restricted area data (e.g., new list of restricted areas).

In response to receiving the message 445 (or performing the retrieval operation), the data storage device 340 may provide a message 447 to the server 240 containing the retrieved updated assistance data. The message 447 may contain the new surrounding area information including the new list of restricted areas as described.

The server 240 may send a message 449 to the UAV 100 providing the new list of restricted areas. The message 449 may contain the updated assistance data, including the new surrounding area information, the new restricted area list, and a new expiration time (ExpT) for the surrounding area information. In response to receiving the message 449, the processor of the UAV 100 may proceed to determination block 439 as described. The UAV 100 may navigate with respect to the RAs provided in the assistance data in block 440.

Figure 4B:
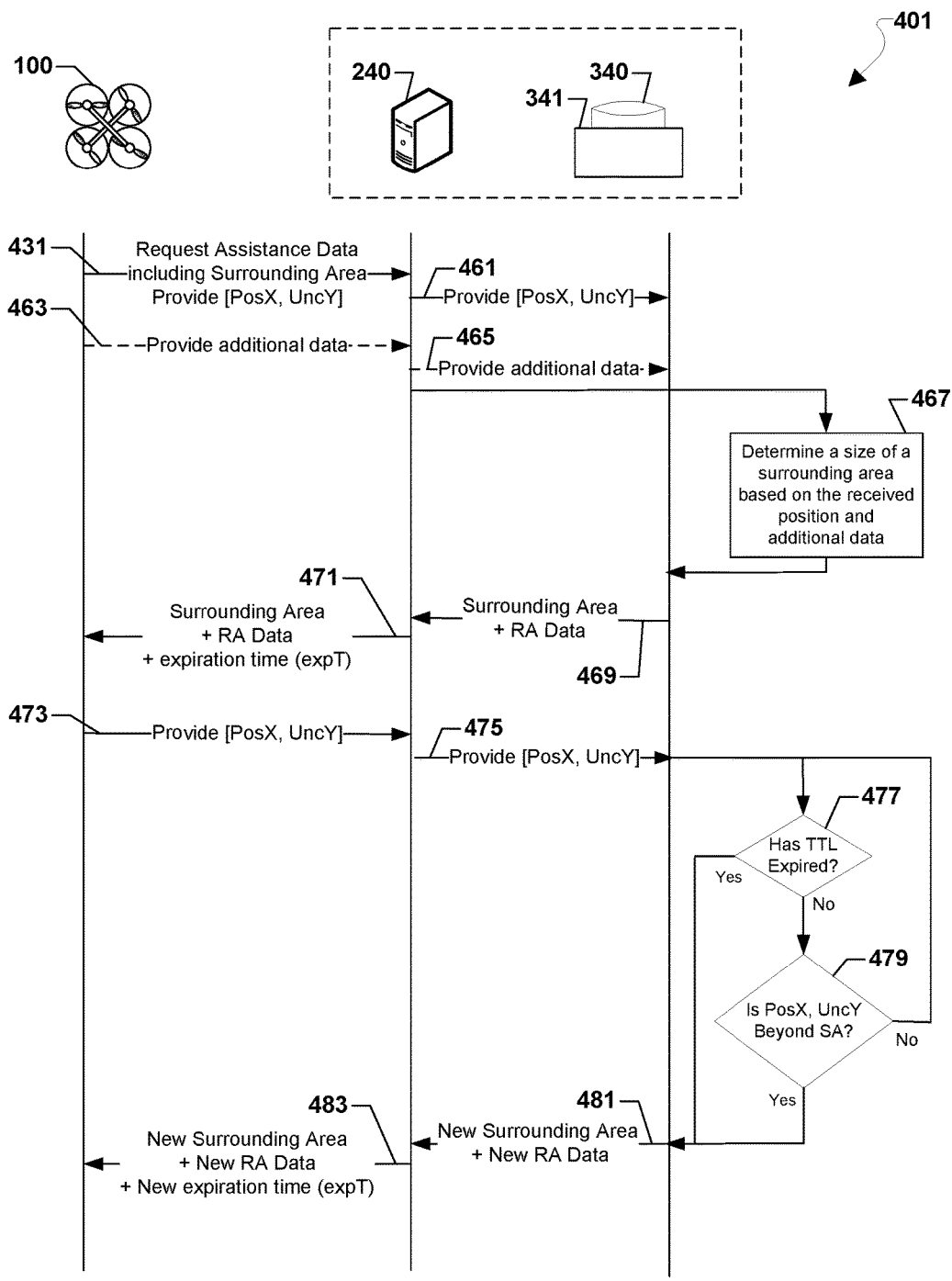
FIG. 4B is a message flow diagram further illustrating messages exchanged between a UAV, a server and data store in the various embodiments.

FIG. 4B illustrates message flows 401 between components of a system for providing assistance data including a UAV (e.g., 100, 100a-100c in FIGS. 1-4A), a server (e.g., 240), and a database (e.g., 341) of assistance data stored on a data storage device (e.g., 340) according to various embodiments. With reference to FIGS. 1A-4B, before and/or during flight operations, the UAV 100 may send a message 431 to the server 240. In response to the message 431, the server 240 may send a message 461 to the data storage device 340 and/or the database 341 (or may perform a retrieval operation), to provide the position data of the UAV 100 (e.g., as received in the message 431). The UAV 100 may further send a message 463 (as part of the message 431 or separate from the message 431) that provides additional data to the server 240, such as speed, direction, battery charge level, destination, etc. In response to the message 463, the server 240 may provide a message 465 (as part of the message 461 or separate from the message 461) to the data storage device 340 and/or the database 341 (or may perform a retrieval operation). The message 461 and the message 465 may enable the retrieval of the assistance data such as the surrounding area and restricted area data (e.g., list of restricted areas).

In response to receiving the messages 461 and 465, the processor of the server 240, the processor of the database 341, or the processor of the server 240 operating together with the processor of the database 341 may determine a size of a surrounding area in block 467. For example, the processor of the server 240 and/or the database 341 may use the position and any additional data from the messages 461 and 465 to determine the size of the surrounding area. In some embodiments, the additional data may include data of the environment of the UAV 100 (urban, rural, etc.), which may influence the size of the surrounding area.

The server processor may take into consideration the restricted area density, such as the number of restricted areas relevant to the UAV 100, in determining the size of the surrounding area. The number of restricted areas relevant to the UAV 100 may include restricted areas that are "near" the UAV 100, such as within a certain distance from the UAV's position. The number of restricted areas that are relevant to the UAV 100 may also be based upon the speed and direction of the UAV 100. Alternatively or additionally, the server processor may use data that is already stored in the database 341 as described. The processor of the database 341 may send a message 469 to the server 240 representing the surrounding area information including a list of restricted areas contained in the surrounding area. The server 240 may send a message 471 to the UAV 100 containing the surrounding area including the restricted area list and an expiration time. The UAV 100 may navigate using the surrounding area data including the restricted area information and the expiration time.

In some embodiments, the UAV 100 may send a message 473 that provides a position of the UAV 100 to the server 240. For example, in some embodiments, the processor of the UAV 100 may make an approximate determination that the UAV's position is near the boundary of the surrounding area. In some embodiments, the UAV 100 may periodically send a position to the server 240 so that the server 240 may determine whether the position of the UAV 100 is beyond the boundary of the surrounding area. However, reducing the frequency of communications between the UAV 100 and the server 240 may lead to extended battery life. The server 240 may send a message 475 to the database 341 that provides the surrounding area and RA coordinate information of the UAV 100.

In determination block 477, the processor of the database 341 (and or the server 240) may determine whether the expiration time of the surrounding area data has expired. In response to determining that the expiration time of the surrounding area data has not expired (i.e., determination block 477="no") the processor of the database 341 (and or the server 240) may proceed to determination block 479.

In determination block 479, the processor of the database 341 (and or the server 240) may determine whether the position of the UAV 100 plus an uncertainty extends beyond the boundary of the surrounding area.

In response to determining that the position of the UAV 100 plus an uncertainty does not extend beyond the boundary of the surrounding area (i.e., determination block 463="No") the processor of the database 341 and/or the server 240 may continue determining whether the expiration time has expired in determination block 477.

In response to determining that the expiration time of the surrounding area data has expired (i.e., determination block 477="Yes") or that the position of the UAV 100 plus an uncertainty extends beyond the boundary of the surrounding area (i.e., determination block 479="Yes"), the processor of the database 341 may send a message 481 to the server 240. The message 481 may contain the new surrounding area and new restricted area data. The processor of the server 240 may send a message 483 to the UAV 100. The message 483 may contain the new surrounding area, the new restricted area data and a new expiration time (ExpT) for the new surrounding area and restricted area data. In other embodiments, determination of whether the expiration time has expired and/or whether the UAV 100 plus an uncertainty extends beyond the boundary of the surrounding area may be performed by the UAV, for example, as described with respect to blocks 439 and 441.

Figure 5:
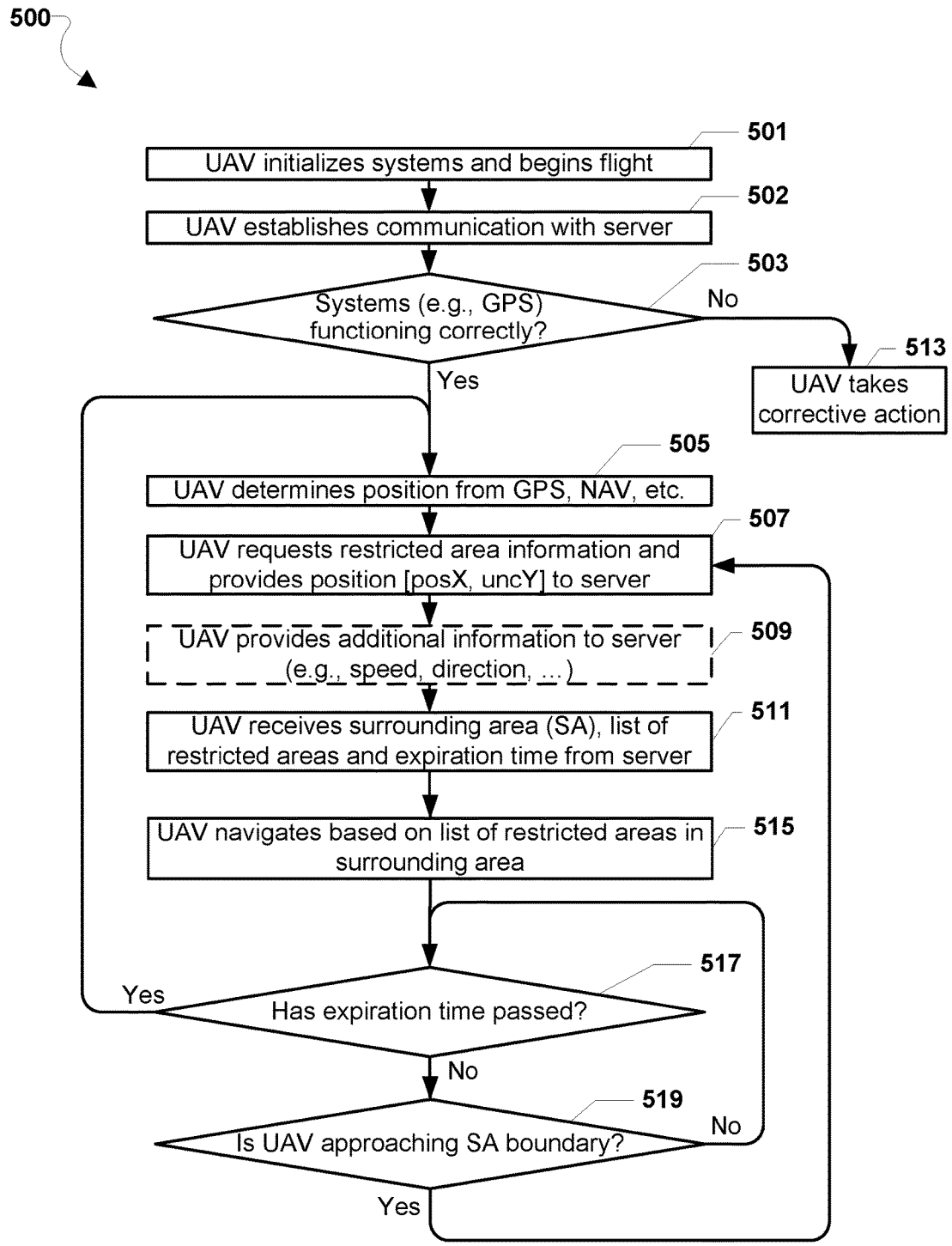
FIG. 5 is a process flow diagram illustrating a method for receiving surrounding area information by a UAV from a server according to various embodiments.

FIG. 5 illustrates a method 500 of operations of a UAV for receiving assistance data according to various embodiments. With reference to FIGS. 1A-5, a UAV, such as the UAV 100, may receive assistance data that enables the UAV to navigate with respect to restricted areas. The restricted area information may be contained in surrounding area information obtained from a server (e.g., 240) according to various embodiments. To perform the operations of the method 500, the processor (such as the processor 120) of the UAV 100 may initialize systems, such as navigation systems, in block 501. The processor of the UAV 100 may establish communication, such as wireless communication with the server 240 in block 502.

In determination block 503, the processor of the UAV 100 may determine whether the various systems are functioning properly. For example, the processor of the UAV 100 may transmit system check messages to the various systems.

In response to determining that one or more of the systems are not functioning properly (i.e., determination block 503="No"), the processor of the UAV 100 may direct the UAV 100 to take corrective action in block 513. For example, the processor of the UAV 100 may direct the UAV 100 to land in a safe area, prevent takeoff, return to a UAV base, etc. In the event that the processor determines that only some of the systems are not functioning, the processor of the UAV 100 may take partial corrective action, such as relying on alternative navigation systems, alternative servers, or information sources, or may wait until systems regain functionality.

In response to determining that the systems are functioning properly (i.e., determination block 503="Yes"), the processor of the UAV 100 may determine the present position of the UAV 100 in block 505, such as from the navigation system 125. In some embodiments, the position of the UAV 100 may include an error or uncertainty factor, such as within a tolerance of 1 m, 3 m, etc.

In block 507, the processor of the UAV 100 may request information associated with the location of restricted areas (assistance data) from the server 240. In addition, the processor of the UAV 100 may provide the position of the UAV 100 (e.g., the position obtained in block 505) plus the uncertainty factor. In various embodiments, the processor of the UAV 100 may make a request by sending a message to the server 240. For example, the processor of the UAV 100 may request a surrounding area with a list of restricted areas in proximity to the position of the UAV 100 obtained in block 505. In some embodiments, the processor of the UAV 100 may be provided with at least an initial surrounding area and list of restricted areas during initialization.

In optional block 509, the processor of the UAV 100 may provide additional information to the server 240. For example, the processor of the UAV 100 may provide speed information, direction information (including rate of ascent or descent), and other information to the server 240. As further examples, the processor of the UAV 100 may transmit along with the request for restricted area information one or more additional parameters such as one or more of: information related to a bandwidth of a communication link between the UAV and the server; an identity of the UAV; a type of the UAV; a speed of the UAV; a destination of the UAV; a direction of the UAV; UAV flying environmental information; a presence of an obstacle near the UAV; preferences (e.g., setting surrounding area size, setting number of RAs in a surrounding area, setting a RA density in a surrounding area, assistance data file size, frequency/scheduling of automatic assistance data updates, etc.); and/or the like.

In block 511, the processor of the UAV 100 may receive surrounding area information from the server 240. For example, the processor of the UAV 100 may receive coordinates and boundary information that define a surrounding area that contains the position of the UAV (and optionally plus the uncertainty value). The surrounding area may also surround a number of restricted areas. In some embodiments, the surrounding area information may also include an expiration time or "time to live."

In block 515, the processor of the UAV 100 may use the surrounding area information and the restricted area information to navigate with respect to the restricted areas. For example, the processor of the UAV 100 may navigate to avoid the restricted areas in the surrounding area. In some embodiments, the processor of the UAV 100 may access the restricted areas based on various access criteria. The assistance data may include the access criteria. The assistance data may also include conditional access information for at least some of the restricted areas.

In determination block 517, the processor of the UAV 100 may determine whether the expiration time received in block 511 has expired. For example, the expiration time may be stored in a register that is decremented according to a clock signal. Alternatively or additionally, the expiration time may be tracked in a clock circuit of the processor or in any other suitable manner.

In response to determining that the expiration time has not expired (i.e., determination block 517="No"), the processor of the UAV 100 may determine whether the position of the UAV 100 (plus an uncertainty factor) is approaching the boundary of the current surrounding area in determination block 519. For example, the processor of the UAV 100 may determine whether the current position of the UAV 100 plus an uncertainty factor is at or extends over the boundary of the current surrounding area (i.e., is outside the current surrounding area). In some embodiments, the processor of the UAV 100 may determine that the position of the UAV 100 plus an uncertainty factor is within a certain distance from the surrounding area boundary while not crossing the boundary.

In response to determining that the position of the UAV 100 plus an uncertainty factor is not approaching the boundary of the current surrounding area (i.e., determination block 519="No"), the processor of the UAV 100 may determine whether the expiration time has expired in determination block 517.

In response to determining that the expiration time has expired (i.e., determination block 517="Yes") or that the position of the UAV 100 plus an uncertainty factor is approaching the boundary of the current surrounding area (i.e., determination block 519="Yes"), the processor of the UAV 100 may request a new surrounding area from the server 240 based on the present UAV position in block 507. As described, in some embodiments the UAV 100 may transmit an update request message in block 507 for other reasons or upon other events (e.g., upon receiving a new mission assignment, upon detecting a change in weather, in response to a battery level or other vehicle status, upon receiving new credentials or priorities, etc.). Thus, the request to the server 240 for a new surrounding area in block 507 may also include information regarding the reason that the UAV 100 is requesting the update.

In some embodiments, the server 240 rather than the UAV 100 may determine that the position of the UAV 100 requires a new surrounding area. In such embodiments, the server 240 may know the direction and speed of the UAV 100 from which the server 240 may determine the surrounding area to transmit to the UAV, and may also determine the size of the surrounding area as discussed herein. For example, the server 240 may determine that the position of the UAV 100 requires a new surrounding area while the current position of the UAV 100 remains within a current surrounding area in a situation in which there are overlapping or adjacent surrounding areas along flight path of the UAV 100.

Figure 6:
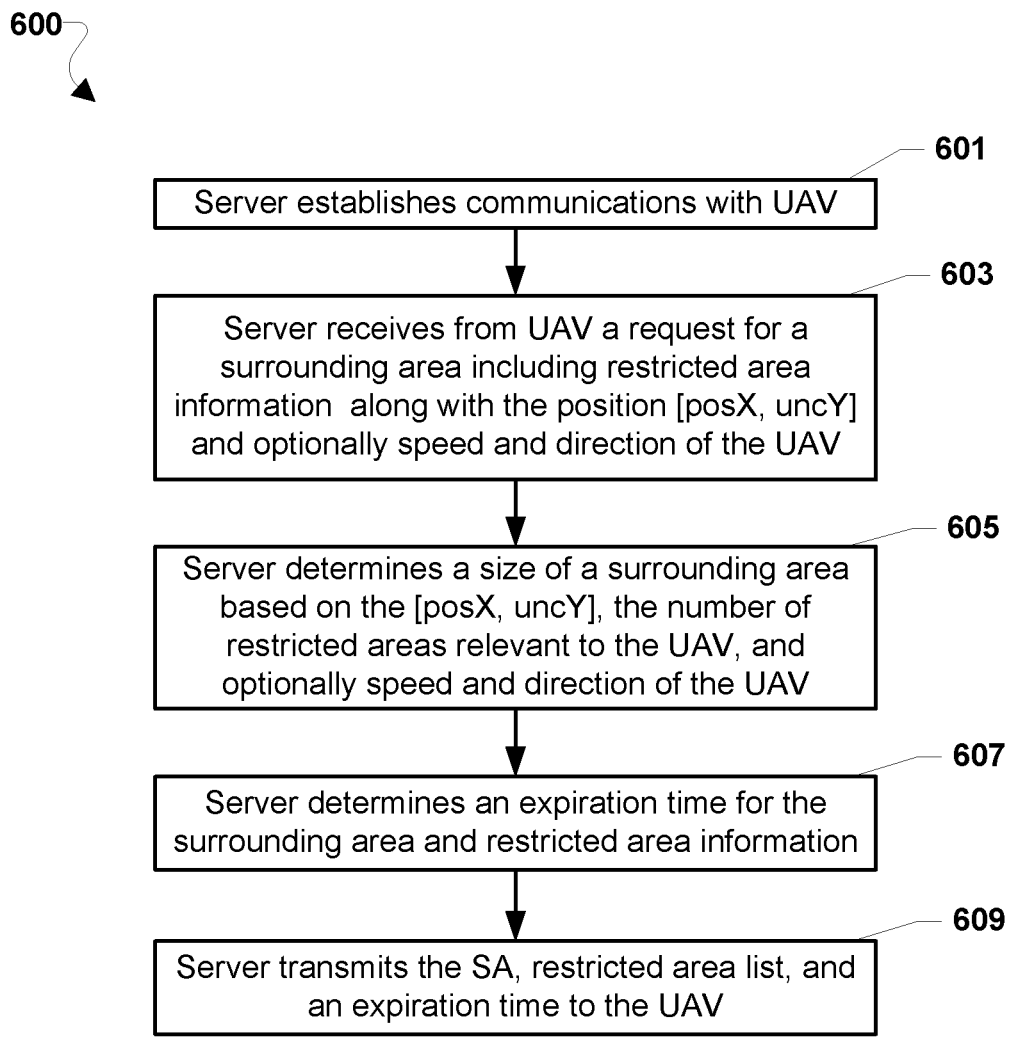
FIG. 6 is a process flow diagram illustrating a method for providing surrounding area information to a UAV by a server according to various embodiments.

FIG. 6 illustrates a method 600 that may be implemented in a server for providing a UAV, such as the UAV 100 in FIGS. 1-4B, with assistance data according to various embodiments. With reference to FIGS. 1A-6, in block 601, the server (e.g., server 240) may establish communications with the UAV (e.g., UAV 100). For example, the server may connect to the UAV through a radio on the UAV that is configured to support multiple communication connections, such as Wi-Fi, local area network (LAN), or other short range communication, cellular or Wide Area Network (WAN) connection, or possibly a wired connection when the UAV is coupled to a base station, charging station or other stationary communication station. The UAV may support network connections and communications using Internet Protocol (IP) or similar network protocol. The server may establish a connection with the UAV through a series of intermediate nodes. The server may accept an Internet based connection from the UAV.

In block 603, the server may receive a request from the UAV to provide the UAV with the surrounding area information including restricted area information and other information. In some embodiments, the server may be a local server. That is, the server may be local to the restricted area that the UAV is attempting to enter. For example, the local server may be associated with a beacon (e.g., 215). In some embodiments, the server may be a server operated by the UAV operator. In such an example, the server may receive the request for the surrounding area information from the UAV before the UAV embarks on a flight. In some embodiment, the server may receive the request for the surrounding area information while the UAV is in flight. In some embodiments, the server may be operated by the UAV operator, and may receive the request for the surrounding area information from the UAV through a local server, or a local access point, with which the UAV has established communication.

In block 605, the server may determine the size of the surrounding area based on the position of the UAV, the number or density of RAs relevant to the UAV, the speed and direction of the UAV, and/or the like. For example, when the UAV is in an area (e.g., rural area) with a low density of RAs, the size of the surrounding area may be set relatively large. When the UAV is in an area (e.g., urban area) with a high density of RAs, the size of the surrounding area may be set relatively small. The size of the surrounding area may also be set based on other factors such as the memory capacity of the UAV, the bandwidth of the communication channel between the UAV and the server, and so on. In some embodiments, the surrounding area may be set as a "tile" that covers an area in which the UAV may operate. Depending on the speed and direction of the UAV, the server may determine which surrounding area tile to provide next, such as when the UAV approaches the boundary of the current surrounding area tile.

Adjusting the surrounding area size based on RA density in block 605 may address various challenges. For example, a small surrounding area size in high RA density areas may limit the size of the data file associated with the surrounding area that is transmitted to the UAV. Reducing the file size transmitted to a UAV may be helpful when many UAVs are communicating with the server. In some embodiments, the UAV may have limited storage capabilities for storing surrounding area and RA data, particularly in high RA density areas. However, a smaller surrounding area may require the UAV to request updates more frequently as the UAV will approach a boundary sooner when the surrounding area is small. By setting the surrounding area size to be very large in areas where there are few or no RAs, the frequency of update requests from UAVs may be relatively low.

The server may further take into consideration the effective range of the UAV when defining the size of the surrounding area in block 605. For example, based on a given level of charge the UAV may be correspondingly limited in range. In the event charging facilities are present in the surrounding area, the range of the UAV may be extended.

In various embodiments, the server may configure the surrounding area so that the boundaries of the surrounding area include restricted areas relevant to the UAV without centering the surrounding area on the UAV. The boundary of the surrounding area may be irregular. In other words, rather than centering the surrounding area on the position of the UAV, the server may set the center, size and shape of the surrounding area in block 605 to avoid arbitrarily excluding a restricted areas on the boundaries.

In some embodiments, the server may determine the boundaries of the surrounding area further based on other criteria. For example, the server may set the boundaries of the surrounding area based in part on information related to a bandwidth of a communication link between the UAV and the server, because the larger the surrounding area, the more RA information will need to be uploaded to the UAV in a given transmission. As a further example, the server may set the boundaries of the surrounding area based in part on an identity of the UAV and/or a type of the UAV. As a further example, the server may set the boundaries of the surrounding area based in part on the speed of the UAV, a destination of the UAV, a direction of the UAV, UAV flying environmental information, a time of day, a day of the week, a day of the month, a day of the year, a season, and a weather condition in the surrounding area. As a further example, the server may set the boundaries of the surrounding area based in part upon how frequently the boundaries and/or restrictions change in restricted areas, and/or a presence of an obstacle within the surrounding area (e.g., a mountain or building that the UAV must fly around).

In some embodiments, when there are no RAs in a given region in which the UAV is operating, the server may determine a largest appropriate surrounding area size in block 605, such a surrounding area that encompasses the entire travel range of the UAV (e.g., based on UAV model, battery charge state, wind direction, etc.). In such a situation, the surrounding area message may include only the boundaries of the surrounding area with no RA information.

In block 607, the server may determine an expiration time for the surrounding area information including the restricted area information. For example, the list of restricted areas within the surrounding area that is provided by the server may include restricted areas that are restricted based on time constraints. Thus, the list of restricted areas provided in the surrounding area may be valid for a given time period only. In various embodiments, the expiration time of a surrounding area may be set according to the expected dynamism or rate of change of the restricted status of the RAs. For example, the server may provide a relatively long expiration time for RAs having a relatively static status. The expiration time may take into account the time constraints on the existing restricted areas. The expiration time may take into account new restricted areas that may become active within the surrounding area at a particular time. In some embodiments, the server may receive information on an ad-hoc basis that requires an update of the surrounding area information. In such a case, the server may send a surrounding area update without receiving a request from the UAV.

In block 609, the server may transmit the surrounding area information including the restricted area information and the expiration time to the UAV.

Figure 7:
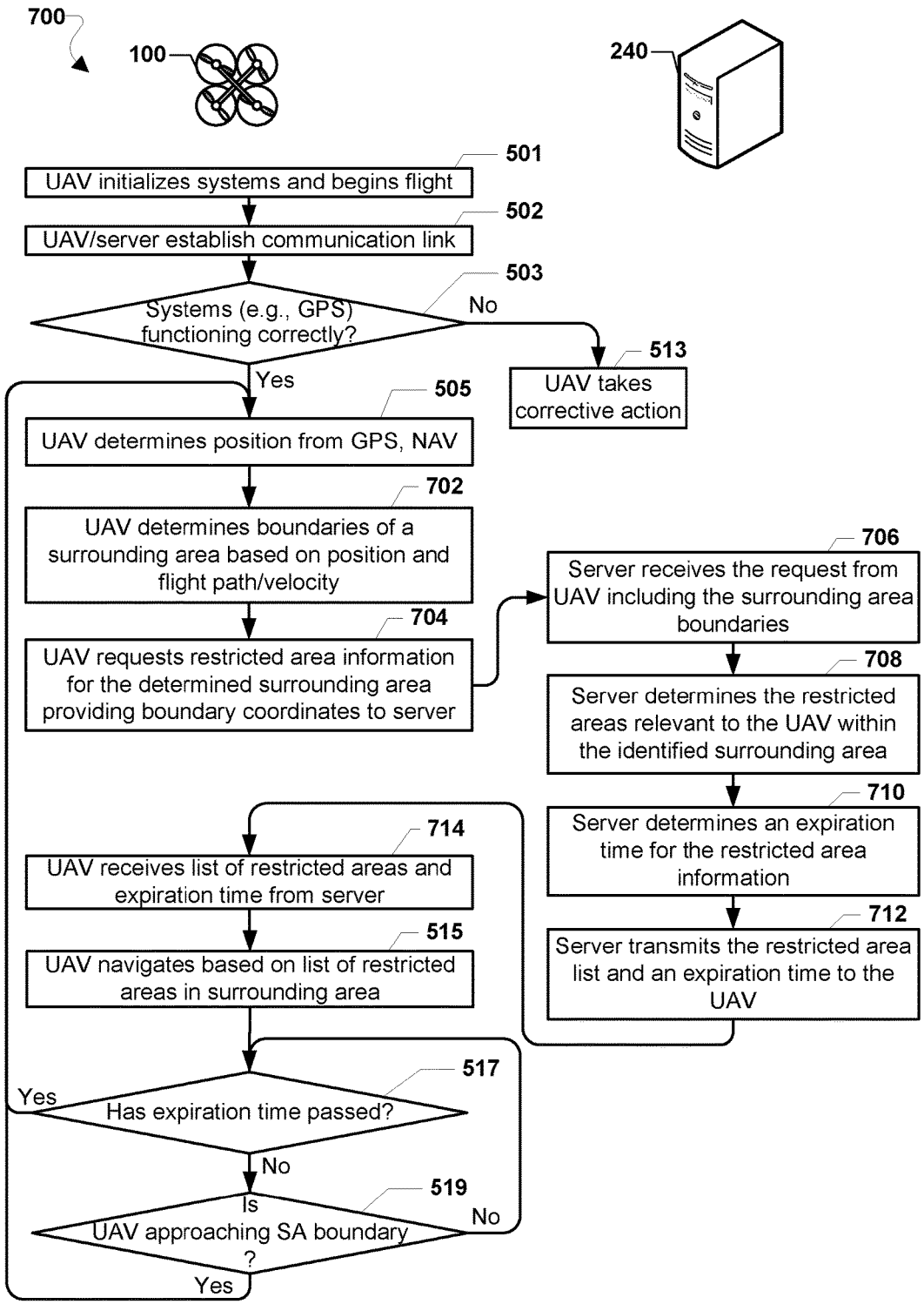
FIG. 7 is a process flow diagram illustrating a method for providing restricted area information to a UAV by a server based on a surrounding area defined by the UAV according to various embodiments.

FIG. 7 illustrates a method in which a UAV may define the boundaries of the surrounding area and a server may inform the UAV of restricted areas within the defined surrounding area according to some embodiments. With reference to FIGS. 1A-7, a UAV, such as the UAV 100, may define the boundaries of the surrounding area and send the surrounding area boundaries to a server, such as the server 240, requesting information on the restricted areas within the surrounding area. Operations of the method 700 may be performed by a UAV processor (e.g., processor 120) in communication with a server (e.g., 240). In method 700, the UAV processor may perform operations of like number blocks 501-503 and 513.

In block 505, the UAV processor may determine the present position of the UAV 100, such as from the navigation system 125. In some embodiments, the position of the UAV 100 may include an error or uncertainty factor, such as within a tolerance of 1 m, 3 m, etc.

In block 702, the UAV processor may determine a surrounding area about the UAV 100, including identifying coordinates defining the boundaries. The processor may determine the surrounding area based upon a variety of factors and information known to the UAV processor, such as location, flight path, destination, flying range (e.g., based on a battery charge state), current, planned or maximum flying speed, weather conditions, and/or the like. In some embodiments, the UAV processor may have some information about restricted areas, such as from previous surrounding areas or preloaded data, which the processor may take into account when defining the surrounding area. In some embodiments, the UAV processor may determine the surrounding area by downloading surrounding areas from memory based on the coordinates of the UAV, such as in a table look up of a pre-loaded database of surrounding areas indexed to coordinates.

In block 704, the UAV processor may transmit, to the server 240, a request for restricted area information for the surrounding area determined in block 702. This request may include the boundary coordinates of the surrounding area, as well as other information (e.g., UAV identifiers, priorities levels, mission data, etc.)

In block 706, the server 240 may receive the request from the UAV 100, including the surrounding area boundaries. In block 708, the server 240 may determine the restricted areas that are relevant to the UAV 100 and within the identified surrounding area. For example, the server 240 may perform a table look up of restricted areas based on the coordinates of the identified surrounding area. The server 240 may also determine whether each restricted area within the identified surrounding area includes restrictions pertinent to the requesting UAV 100. Some restricted areas may permit overflights by certain types of UAVs or UAV operators (e.g., government operated UAVs) while prohibiting overflights by others (e.g., hobbyists). Also, some restricted areas may prohibit overflights only during certain hours and/or days of the week. Therefore, in block 706 the server 240 may generate a list of only those restricted areas within the identified surrounding area that the UAV 100 needs to observe.

In block 710, the server 240 may determine an expiration time for the restricted area information. For example, the list of restricted areas within the UAV-identified surrounding area may include restricted areas that are restricted based on time constraints. Thus, the list of restricted areas may be valid for a given time period only. In various embodiments, the expiration time of restricted area information may be set according to the expected dynamism or rate of change of the restricted status of the restricted areas. For example, the server 240 may provide a relatively long expiration time for restricted areas having a relatively static status. The expiration time may take into account the time constraints on the existing restricted areas. The expiration time may take into account new restricted areas that may become active within the surrounding area at a particular time. In some embodiments, the server 240 may receive information on an ad-hoc basis that requires an update of the restricted area information. In such a case, the server 240 may update the restricted area information without receiving a request from the UAV 100.

In block 712, the server 240 may transmit the restricted area information and the expiration time to the UAV 100.

In block 714, the processor of the UAV 100 may receive the restricted area information and expiration time from the server 240. In block 515, the processor of the UAV 100 may use the surrounding area and the restricted area information to navigate with respect to the restricted areas as described in the method 500.

In determination block 517, the processor of the UAV 100 may determine whether the expiration time received in block 714 has expired. For example, the expiration time may be stored in a register that is decremented according to a clock signal. Alternatively or additionally, the expiration time may be tracked in a clock circuit of the processor or in any other suitable manner.

In response to determining that the expiration time has not expired (i.e., determination block 517="No"), the processor of the UAV 100 may determine whether the position of the UAV 100 (plus an uncertainty factor) is approaching the boundary of the current surrounding area in determination block 519. For example, the processor of the UAV 100 may determine whether the current position of the UAV 100 plus an uncertainty factor is at or extends over the boundary of the current surrounding area (i.e., is outside the current surrounding area). In some embodiments, the processor of the UAV 100 may determine that the position of the UAV 100 plus an uncertainty factor is within a certain distance from the surrounding area boundary while not crossing the boundary.

In response to determining that the position of the UAV 100 is not approaching the boundary of the current surrounding area (i.e., determination block 519="No"), the processor of the UAV 100 may continue to determine whether the expiration time has expired in determination block 517.

In response to determining that the expiration time has expired (i.e., determination block 517="Yes") or that the position of the UAV 100 is approaching the boundary of the current surrounding area (i.e., determination block 519="Yes"), the processor of the UAV 100 may update the position data in block 505, determine a new surrounding area based on the present UAV position in block 702 and request restricted area information for the new surrounding area in block 704 as described.

Figure 8:
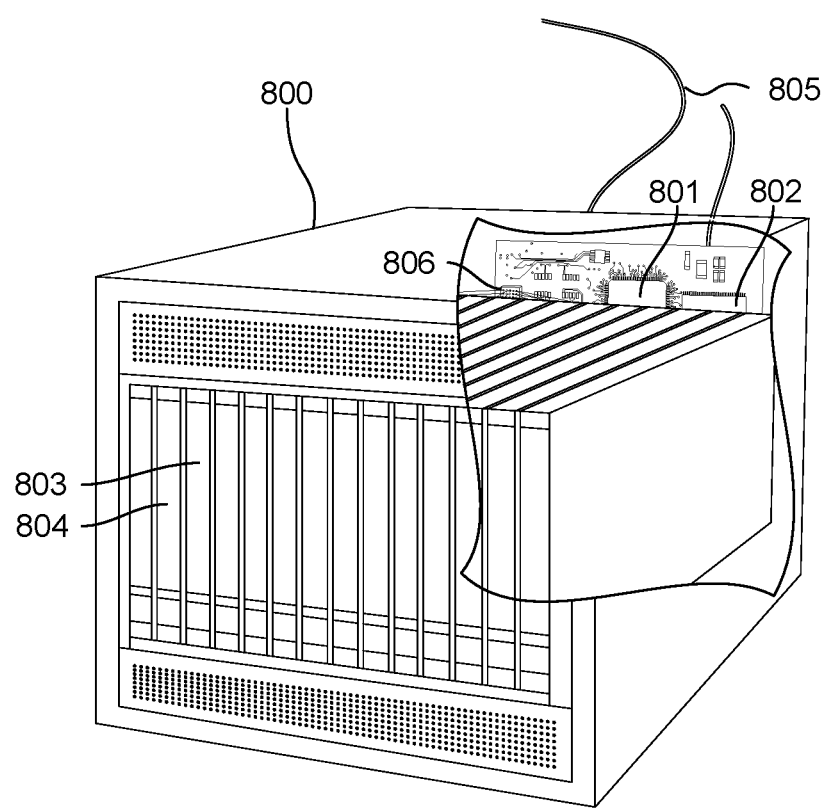
FIG. 8 is a component diagram of an example server suitable for use with the various embodiments.

Various embodiments, including embodiments described with reference to FIGS. 1-7, may be implemented using any of a variety of commercially available server devices, such as server 800 illustrated in FIG. 8. With reference to FIGS. 1-8, such a server 800 (which may correspond to the server 240) typically includes a processor 801 coupled to volatile memory 802 and a large capacity nonvolatile memory, such as a disk drive 803. The server 800 may also include a floppy disc drive, compact disc (CD) or DVD disc drive 806 coupled to the processor 801. The server 800 may also include network access ports 804 coupled to the processor 801 for establishing data connections with a network 805, such as a local area network coupled to other broadcast system computers and servers. The server processor 801 may be any programmable microprocessor, microcomputer or multiple processor chip or chips that can be configured by software instructions (applications) to perform a variety of functions, including the functions of the various embodiments described above. Typically, software applications may be stored in the internal memory 802 and 803 before they are accessed and loaded into the processor 801. The processor 801 may include internal memory sufficient to store software instructions. For the purposes of this description, a general reference to memory refers to memory accessible by the processor 801 including volatile memory 802, disk drives 803, floppy disc drives, CD/DVD disc drives 806 and memory within the processor 801 itself.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A server, comprising:
   a network interface; and
   a server processor configured with processor-executable instructions to:
   receive from an unmanned autonomous vehicle (UAV) a request for information regarding areas of restricted air space ("restricted areas");
   determine boundaries of a surrounding area containing a position of the UAV; and
   transmit, to the UAV, coordinate information defining restricted areas contained within the surrounding area.

2. The server of claim 1, wherein the server processor is further configured with processor-executable instructions to determine boundaries of the surrounding area containing the position of the UAV based at least in part on a density of restricted areas surrounding the UAV.

3. The server of claim 1, wherein the server processor is further configured with processor-executable instructions to determine boundaries of the surrounding area containing the position of the UAV by receiving coordinates defining boundaries of the surrounding area from the UAV.

4. The server of claim 1, wherein the server processor is further configured with processor-executable instructions to determine boundaries of the surrounding area containing the position of the UAV based on one or more parameters selected from a group including information related to a bandwidth of a communication link between the UAV and the server, an identity of the UAV, a type of the UAV, a speed of the UAV, a destination of the UAV, a direction of the UAV, UAV flying environmental information, a time of day, a day of week, a day of month, a day of year, a season, a change frequency of restricted areas, a presence of an obstacle, or a weather condition in the surrounding area.

5. The server of claim 1, wherein the server processor is further configured with processor-executable instructions to determine boundaries of the surrounding area containing the position of the UAV based on communication bandwidth available for transmitting data to the UAV.

6. The server of claim 1, wherein the server processor is further configured with processor-executable instructions to determine boundaries of the surrounding area containing the position of the UAV such that the position of the UAV is contained within the surrounding area but is not centered in the surrounding area.

7. The server of claim 1, wherein the server processor is further configured with processor-executable instructions to:
   determine an expiration time of the coordinate information defining restricted areas contained within the surrounding area; and
   transmit the expiration time to the UAV.

8. The server of claim 1, wherein the server processor is further configured with processor-executable instructions to receive additional information from the UAV including information related to one or more of: a bandwidth of a communication link between the UAV and the server, an identity of the UAV, a type of the UAV, a speed of the UAV, a destination of the UAV, a direction of the UAV, UAV flying environmental information, or a presence of an obstacle near the UAV.

9. The server of claim 8, wherein the server processor is further configured with processor-executable instructions to determine boundaries of the surrounding area containing the position of the UAV and locations of restricted areas contained within the surrounding area based in part on the additional information received from the UAV.

10. The server of claim 1, wherein the server processor is further configured with processor-executable instructions to receive, from the UAV along with the received request for information regarding restricted areas, second coordinate information defining the surrounding area.

11. The server of claim 1, wherein the server processor is further configured with processor-executable instructions to:
receive, from the UAV, position information of the UAV;
determine second coordinate information defining boundaries of the surrounding area based on the received position information; and
transmit the determined second coordinate information to the UAV.

12. The server of claim 1, wherein the server processor is further configured with processor-executable instructions to:
receive, from the UAV, a request for updated information regarding restricted areas contained within the surrounding area;
determine updated restricted area information; and
transmit the updated restricted area information to the UAV.

13. The server of claim 1, wherein the server processor is further configured with processor-executable instructions to determine a size of the surrounding area based on at least one of the position of the UAV, a number or density of restricted areas relevant to the UAV, or a speed and direction of the UAV.

14. The server of claim 1, wherein the transmitted coordinate information includes a list of the restricted areas.

15. A non-transitory processor-readable storage medium having stored thereon processor-executable instructions configured to cause a server processor to perform operations comprising:
receiving from an unmanned autonomous vehicle (UAV) a request for information regarding areas of restricted air space ("restricted areas");
determining boundaries of a surrounding area containing a position of the UAV; and
transmitting coordinate information defining the restricted areas contained within the surrounding area to the UAV.

16. The non-transitory processor-readable storage medium of claim 15, wherein the stored processor-executable instructions are configured to cause the server processor to perform operations further comprising determining boundaries of the surrounding area containing the position of the UAV based at least in part on a density of restricted areas surrounding the UAV.

17. The non-transitory processor-readable storage medium of claim 15, wherein the stored processor-executable instructions are configured to cause the server processor to perform operations further comprising determining boundaries of the surrounding area containing the position of the UAV by receiving coordinates defining boundaries of the surrounding area from the UAV.

18. The non-transitory processor-readable storage medium of claim 15, wherein the stored processor-executable instructions are configured to cause the server processor to perform operations further comprising determining boundaries of the surrounding area containing the position of the UAV based on one or more parameters selected from a group including information related to a bandwidth of a communication link with the UAV, an identity of the UAV, a type of the UAV, a speed of the UAV, a destination of the UAV, a direction of the UAV, UAV flying environmental information, a time of day, a day of week, a day of month, a day of year, a season, a change frequency of restricted areas, a presence of an obstacle, or a weather condition in the surrounding area.

19. The non-transitory processor-readable storage medium of claim 15, wherein the stored processor-executable instructions are configured to cause the server processor to perform operations further comprising determining boundaries of the surrounding area containing the position of the UAV based on communication bandwidth available for transmitting data to the UAV.

20. The non-transitory processor-readable storage medium of claim 15, wherein the stored processor-executable instructions are configured to cause the server processor to perform operations such that determining boundaries of the surrounding area containing the position of the UAV comprises determining boundaries of the surrounding area so that the position of the UAV is contained within the surrounding area but is not centered in the surrounding area.

21. The non-transitory processor-readable storage medium of claim 15, wherein the stored processor-executable instructions are configured to cause the server processor to perform operations further comprising:
determining an expiration time of the coordinate information defining the restricted areas contained within the surrounding area; and
transmitting the determined expiration time to the UAV.

22. The non-transitory processor-readable storage medium of claim 15, wherein the stored processor-executable instructions are configured to cause the server processor to perform operations further comprising receiving additional information from the UAV including information related to one or more of: a bandwidth of a communication link with the UAV, an identity of the UAV, a type of the UAV, a speed of the UAV, a destination of the UAV, a direction of the UAV, UAV flying environmental information, and a presence of an obstacle near the UAV.

23. The non-transitory processor-readable storage medium of claim 22, wherein the stored processor-executable instructions are configured to cause the server processor to perform operations further comprising determining boundaries of the surrounding area containing the position of the UAV and locations of restricted areas contained within the surrounding area based in part on the additional information received from the UAV.

24. The non-transitory processor-readable storage medium of claim 15, wherein the stored processor-executable instructions are configured to cause the server processor to perform operations further comprising receiving, from the UAV along with the received request for information regarding restricted areas, second coordinate information defining the surrounding area.

25. The non-transitory processor-readable storage medium of claim 15, wherein the stored processor-executable instructions are configured to cause the server processor to perform operations further comprising:
receiving, from the UAV, position information of the UAV;

determining second coordinate information defining boundaries of the surrounding area, based on the received position information; and transmitting the determined second coordinate information to the UAV.

26. The non-transitory processor-readable storage medium of claim 15, wherein the stored processor-executable instructions are configured to cause the server processor to perform operations further comprising:

receiving, from the UAV, a request for updated information regarding restricted areas contained within the surrounding area;

determining updated restricted area information; and transmitting the updated restricted area information to the UAV.

27. The non-transitory processor-readable storage medium of claim 15, wherein the stored processor-executable instructions are configured to cause the server processor to perform operations further comprising determining a size of the surrounding area based on at least one of the position of the UAV, a number or density of restricted areas relevant to the UAV, or a speed and direction of the UAV.

28. The non-transitory processor-readable storage medium of claim 15, wherein transmitted coordinate information includes a list of restricted areas.

29. A server, comprising:

means for receiving, from an unmanned autonomous vehicle (UAV), a request for information regarding areas of restricted air space ("restricted areas");

means for determining boundaries of a surrounding area containing a position of the UAV; and means for transmitting, to the UAV, coordinate information defining restricted areas contained within the surrounding area.

* * * * *